United States Patent
Okada et al.

(10) Patent No.: US 9,495,578 B2
(45) Date of Patent: *Nov. 15, 2016

(54) FACE DETECTION DEVICE, IMAGING APPARATUS AND FACE DETECTION METHOD

(75) Inventors: Miyuki Okada, Kanagawa (JP); Ken Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 187 days.

This patent is subject to a terminal disclaimer.

(21) Appl. No.: 13/344,191

(22) Filed: Jan. 5, 2012

(65) Prior Publication Data

US 2012/0114179 A1    May 10, 2012

Related U.S. Application Data

(63) Continuation of application No. 11/888,322, filed on Jul. 31, 2007, now Pat. No. 8,116,536.

(30) Foreign Application Priority Data

Aug. 4, 2006 (JP) ............................... P2006-212841

(51) Int. Cl.
  *G06K 9/00* (2006.01)
  *H04N 5/232* (2006.01)

(52) U.S. Cl.
  CPC ...... *G06K 9/00228* (2013.01); *H04N 5/23219* (2013.01)

(58) Field of Classification Search
  None
  See application file for complete search history.

(56) References Cited

U.S. PATENT DOCUMENTS

| 5,748,776 | A | 5/1998 | Yoshida |
| 7,050,607 | B2* | 5/2006 | Li et al. .......................... 382/118 |
| 2003/0044067 | A1* | 3/2003 | Huang et al. .................. 382/181 |
| 2004/0151381 | A1* | 8/2004 | Porter et al. ................... 382/218 |
| 2005/0281464 | A1 | 12/2005 | Kaku |
| 2006/0008173 | A1* | 1/2006 | Matsugu et al. .............. 382/274 |
| 2006/0033533 | A1* | 2/2006 | Yamada ............. H03K 19/1731 326/95 |
| 2006/0187305 | A1* | 8/2006 | Trivedi et al. ................ 348/169 |
| 2007/0122036 | A1* | 5/2007 | Kaneda .............. G06K 9/00281 382/190 |

FOREIGN PATENT DOCUMENTS

| JP | 7-093561 A | 4/1995 |
| JP | 2003-271933 A | 9/2003 |
| JP | 2004-005384 A | 1/2004 |
| JP | 2004-030629 A | 1/2004 |
| JP | 3561985 B2 | 6/2004 |
| JP | 2005-056387 A | 3/2005 |

* cited by examiner

Primary Examiner — Chan Park
Assistant Examiner — Elisa Rice
(74) Attorney, Agent, or Firm — Chip Law Group

(57) ABSTRACT

A face detection device for detecting the face of a person in an input image may include the following elements: a face detection circuit including a hardware circuit configured to detect a face in an input image; a signal processing circuit configured to perform signal processing based on an input image signal in accordance with a rewritable program including a face detection program for detecting a face in an input image; and a controller configured to allow the face detection circuit and the signal processing circuit to perform face detection on an image of a frame or on respective images of adjacent frames among consecutive frames, and to control face detection by the signal processing circuit on the basis of a face detection result obtained by the face detection circuit.

21 Claims, 15 Drawing Sheets

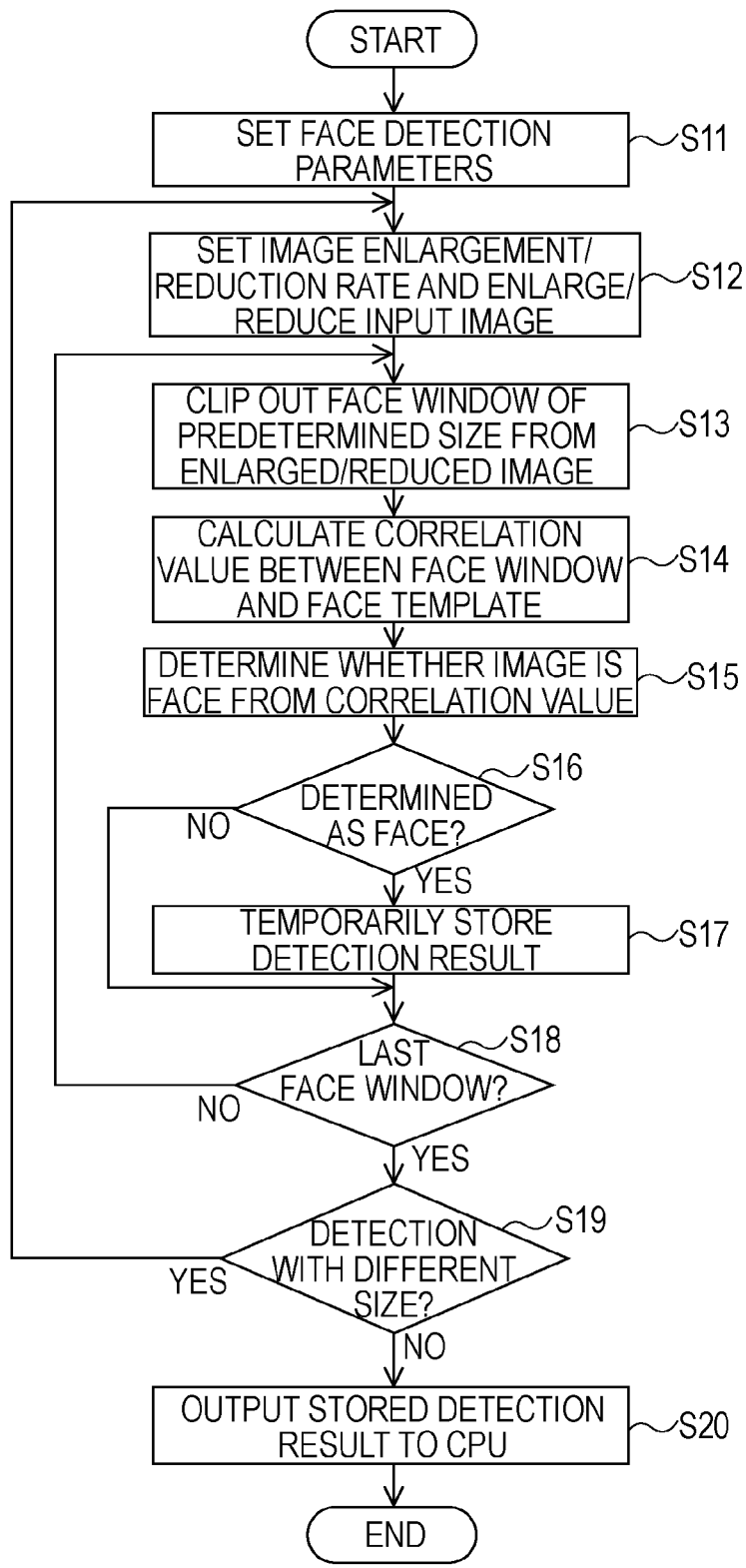

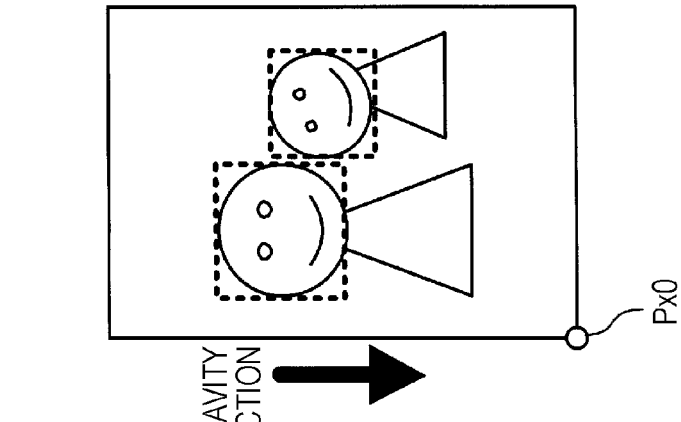
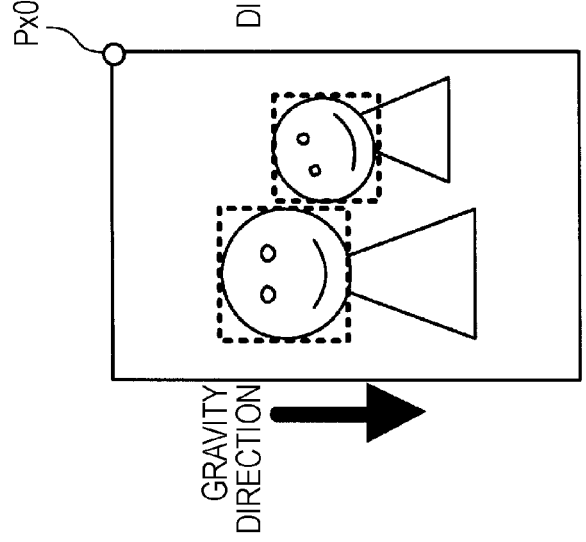
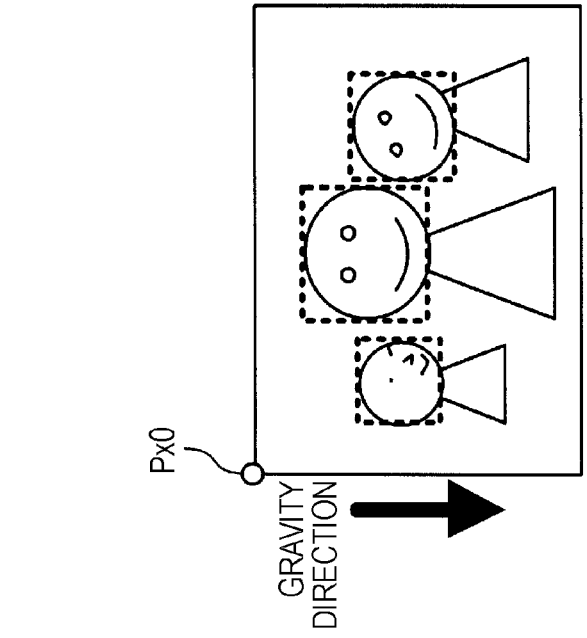
FIG. 4A — IMAGE IS CAPTURED WITH HORIZONTALLY LONG ANGLE OF VIEW (STANDARD IMAGE CAPTURING)
FIG. 4B — IMAGE IS CAPTURED WITH VERTICALLY LONG ANGLE OF VIEW IN WHICH IMAGING APPARATUS IS TILTED TO RIGHT
FIG. 4C — IMAGE IS CAPTURED WITH VERTICALLY LONG ANGLE OF VIEW IN WHICH IMAGING APPARATUS IS TILTED TO LEFT

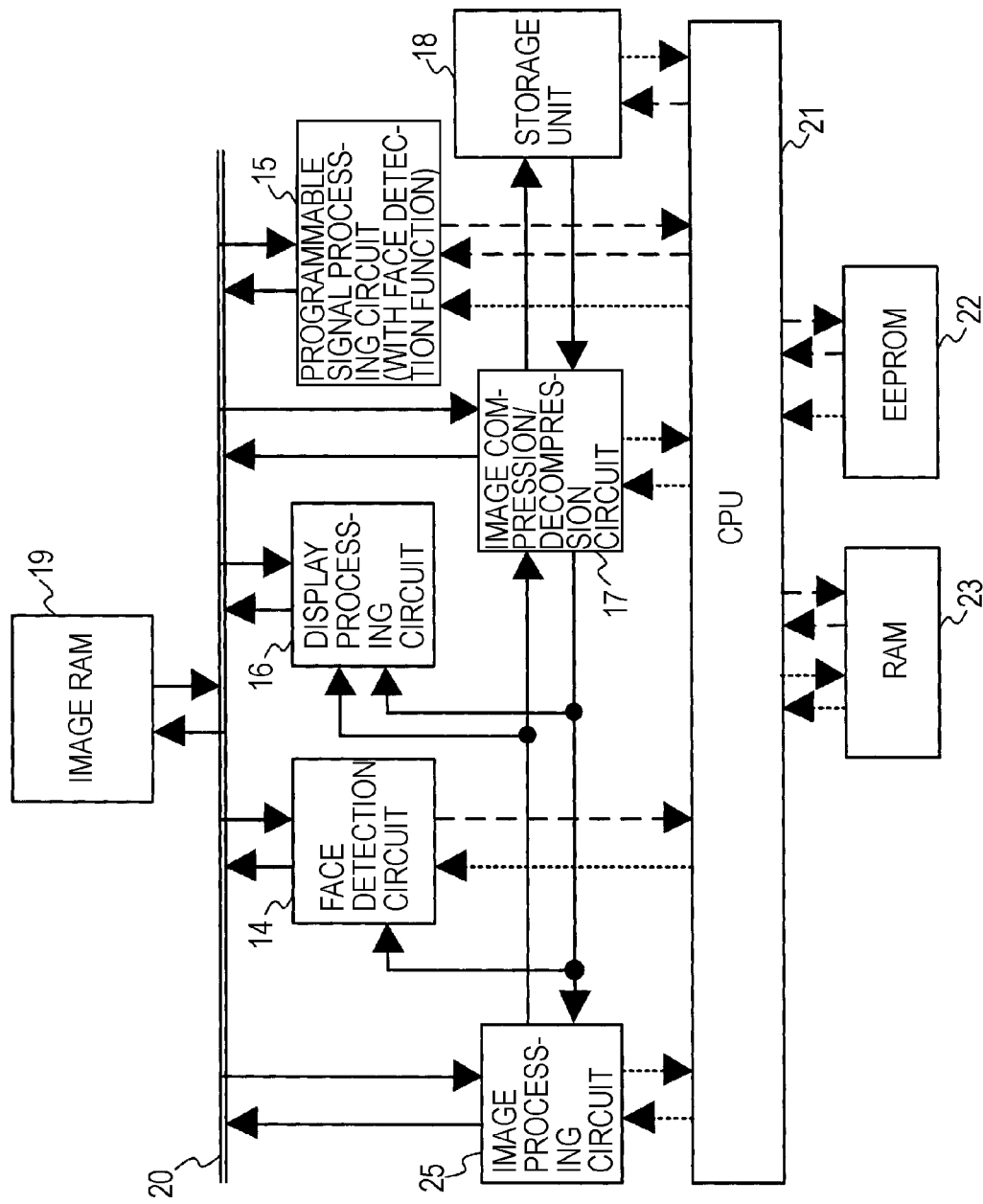

FACE DETECTION DEVICE, IMAGING APPARATUS AND FACE DETECTION METHOD

CROSS-REFERENCE TO RELATED APPLICATIONS

This application is a continuation of U.S. application Ser. No. 11/888,322, filed Jul. 31, 2007, which claims priority from Japanese Patent Application No. JP 2006-212841 filed in the Japanese Patent Office on Aug. 4, 2006, the entire contents of which are incorporated herein by reference.

BACKGROUND OF THE INVENTION

1. Field of the Invention

The present invention relates to a face detection device configured to detect the face of a person in an input image, an imaging apparatus including the function of the face detection device, and a face detection method.

2. Description of the Related Art

In recent years, the use of digital imaging apparatuses including digital still cameras and digital video cameras has been rapidly increasing, and these apparatuses are becoming more sophisticated. This has been resulted in a growing demand for more advanced functions to be included in these apparatuses, whereby the commercial value thereof can be enhanced. An exemplary advanced function that has been the focus in this field is the technique of detecting a specific object in an image.

A representative technique of detecting an object is the technique of detecting the face of a person. With this face detection technique, a face area of a person can be extracted from a captured image, and the extraction result may be applied to various applications in the imaging apparatus or may be recorded as accompanying data of the image.

A known exemplary face detection technique involves conversion of captured image data into luminance data, hue data, and chroma data, and detection of a face area of a person on the basis of a change in luminance in the vertical direction in a skin-color area based on the luminance data and a spatial pixel distribution of skin-color pixels based on the three attribute data (for example, see Japanese Patent No. 3561985, paragraphs [0038] to [0058], FIG. 1). Another known exemplary technique involves detection of a skin-color area and face feature points, such as the eyes and the mouth, in a captured image and determination of whether the skin-color area is the face of a person on the basis of the positions of the feature points (for example, see Japanese Unexamined Patent Application Publication No. 2004-5384, paragraphs [0018] and [0019], FIG. 1). Yet another known exemplary technique that does not particularly use color information involves the matching of a captured image with a face template image using luminance data of the captured image and, in the case where a correlation value between the two images is sufficiently high, it is determined that the captured image is an image of a face (for example, see Japanese Unexamined Patent Application Publication No. 2003-271933, paragraphs [0046] to [0055], FIG. 6).

SUMMARY OF THE INVENTION

Various face detection algorithms are available, as has been described above. The following two points may be important in applying these face detection techniques to imaging apparatuses, regardless of whether a moving image or a still image is recorded. The first important point is the ability to satisfy both the high speed of tracking the motion of an object and the motion of an imaging apparatus itself and the high detection accuracy whereby errors or omissions in detection can be avoided. The second important point is the flexibility or adaptability to diverse detection algorithms and imaging conditions.

Face detection may be performed by software or dedicated hardware. In general, face detection performed by software often fails to achieve the high processing speed. For example, the software may fail to closely track the processing of a monitoring image in a still-image recording mode or the recording of a moving image. The higher the detection accuracy demanded, the higher the processing load. This results in difficulty in implementing the practical detection rate in the imaging apparatus. That is, as has been described in the first important point, it may be very difficult to satisfy both the high speed and the high detection accuracy.

In contrast, face detection performed by dedicated hardware is generally known to greatly improve the processing speed and the detection accuracy, as compared with software. However, as has been mentioned in the second important point, the hardware may have difficulty in adapting to diverse algorithms and imaging conditions or improving the detection performance. The hardware may have limited flexibility or adaptability in terms of detection performance.

It is desirable to provide a widely applicable face detection device, an imaging apparatus, and a face detection method that satisfy both the high speed and the accuracy of face detection.

According to an embodiment of the present invention, there is provided a face detection device for detecting the face of a person in an input image, which may include the following elements: a face detection circuit including a hardware circuit configured to detect a face in an input image; a signal processing circuit configured to perform signal processing based on an input image signal in accordance with a rewritable program including a face detection program for detecting a face in an input image; and a controller configured to allow the face detection circuit and the signal processing circuit to perform face detection on an image of a frame or on respective images of adjacent frames among consecutive frames, and to control face detection by the signal processing circuit on the basis of a face detection result obtained by the face detection circuit.

In such a face detection device, a face detection circuit including a hardware circuit configured to detect a face in an input image may be provided, and a signal processing circuit configured to perform signal processing based on an input image signal in accordance with a rewritable program may be provided. By executing a face detection program by the signal processing circuit, the signal processing circuit may also perform face detection. A controller may allow the face detection circuit and the signal processing circuit to perform face detection on an image of a frame or on respective images of adjacent frames among consecutive frames, and to control face detection by the signal processing circuit on the basis of a face detection result obtained by the face detection circuit.

According to the face detection device of the embodiment of the present invention, since the face detection circuit may include the hardware circuit configured to perform face detection, the face detection by the face detection circuit can be performed quickly. By controlling the face detection performed by the signal processing circuit on the basis of the detection result obtained by the face detection circuit, the overall face detection accuracy can be improved. Since the face detection performed by the signal processing circuit may be controlled on the basis of the face detection result obtained by the face detection circuit, the face detection performed by the signal processing circuit may become more efficient, thereby improving the face detection accuracy while reducing the processing time. By changing a program to be executed by the signal processing circuit, various face detection algorithms and processes other than the face detection process can be performed by the signal processing circuit. Accordingly, the flexibility or adaptability to specification changes or feature expansion of a product can be enhanced. Therefore, both the high processing speed and the high accuracy in face detection can be achieved, and a face detection device that can be applied to a wide variety of applications can be implemented.

BRIEF DESCRIPTION OF THE DRAWINGS

FIG. 3 is a flowchart of a basic face detection process performed by the face detection circuit;

FIGS. 4A to 4C illustrate the relationship between the angle of view at the time an image is captured and a face search angle;

FIG. 15 is a block diagram of the configuration of an image recording/reproducing apparatus according to another embodiment of the present invention.

DETAILED DESCRIPTION

Exemplary embodiments of the present invention will now herein be described in detail below.

Figure 1:
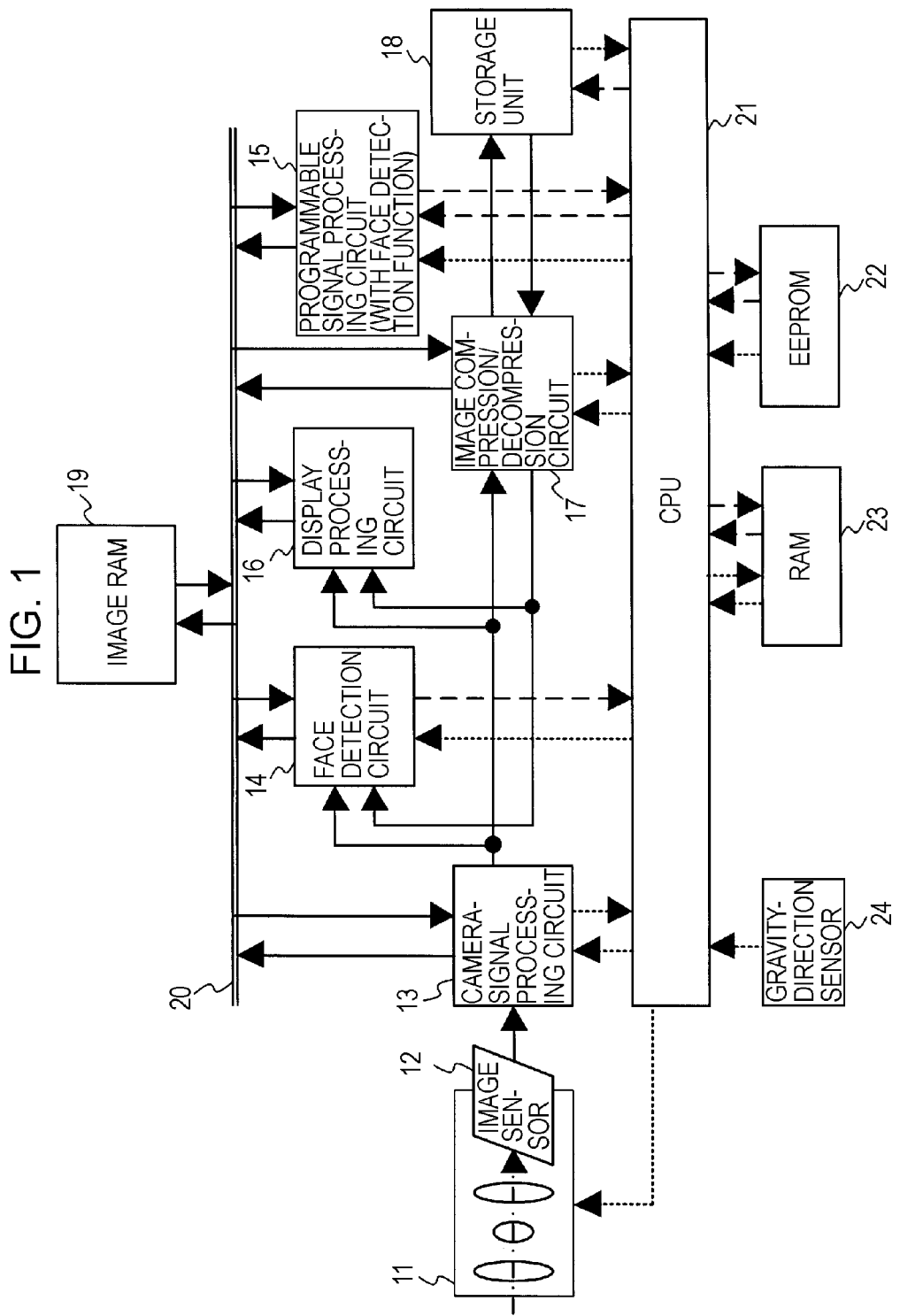
FIG. 1 is a block diagram of the configuration of main elements of an imaging apparatus according to an embodiment of the present invention.

FIG. 1 is a block diagram of the configuration of main elements of an imaging apparatus according to an embodiment of the present invention. In FIG. 1, solid arrows indicate paths of image data; dotted arrows indicate paths of control data; and broken arrows indicate paths of data indicating a face detection result, which is part of the control data.

The imaging apparatus shown in FIG. 1 is implemented as a digital still camera, a digital video camera, or the like. The imaging apparatus includes an optical block 11, an image sensor 12, a camera-signal processing circuit 13, a face detection circuit 14, a programmable signal processing circuit 15, a display processing circuit 16, an image compression/decompression circuit 17, a storage unit 18, an image random access memory (RAM) 19, an image bus 20, a central processing unit (CPU) 21, an electrically erasable programmable read-only memory (EEPROM) 22, a RAM 23, and a gravity-direction sensor 24.

The optical block 11 includes a lens configured to focus light reflected from an object to the image sensor 12, a drive mechanism configured to move the lens to adjust the focus or to zoom in/out, a shutter mechanism, an iris mechanism, and the like. These drive mechanisms contained in the optical block 11 are driven in accordance with a control signal from the CPU 21. The image sensor 12 is, for example, a solid-state image pickup device, such as a charge-coupled device (CCD) or a complementary metal oxide semiconductor (CMOS), and converts incident light from the object into an electrical signal.

The camera-signal processing circuit 13 is a block configured to apply various signal processes to an image signal output from the image sensor 12. More specifically, for example, the block includes the function of converting an image signal from the image sensor 12 into digital data, various detection functions for the digital image data, and various image-quality correction functions for the image data. Detection information from the camera-signal processing circuit 13 is supplied to the CPU 21. On the basis of the detection information, the CPU 21 calculates control values for auto-focus (AF) processing, auto-exposure (AE) processing, and the image-quality correction functions in the camera-signal processing circuit 13. The image-quality correction functions in the camera-signal processing circuit 13 include a gain correction function, a white-balance adjustment function, and the like.

The face detection circuit 14 is dedicated hardware configured to detect the face of a person in an input image. The face detection circuit 14 receives image data output from the camera-signal processing circuit 13 via the image RAM 19, detects an area where the face of a person exists, and supplies the detection result to the CPU 21.

The programmable signal processing circuit 15 is a block configured to apply signal processes to image data read from the image RAM 19. The programmable signal processing circuit 15 can perform a plurality of types of signal processes by reading programs from the CPU 21. Specifically in the embodiment, the programmable signal processing circuit 15 is configured to execute a program for detecting the face of a person in an input image. That is, both the face detection circuit 14 and the programmable signal processing circuit 15 have the face detection function.

The display processing circuit 16 receives image data output from the camera-signal processing circuit 13 and the image compression/decompression circuit 17 via the image RAM 19, converts the image data into an image signal to be displayed, and supplies the image signal to a monitor (not shown) including, for example, a liquid crystal display (LCD).

The image compression/decompression circuit 17 receives image data output from the camera-signal processing circuit 13 via the image RAM 19, compresses/encodes the image data, and outputs the compressed/encoded image data as a data file including a moving image or a still image to the storage unit 18. The image compression/decompression circuit 17 decompresses/decodes an image data file read from the storage unit 18 and supplies the decompressed/decoded image data to the display processing circuit 16 via the image RAM 19. For example, the Moving Picture Experts Group (MPEG) standard may be employed as an encoding standard for moving images, and the Joint Photographic Experts Group (JPEG) standard may be employed as an encoding standard for still images.

The storage unit 18 is a unit configured to store image files encoded and generated by the image compression/decompression circuit 17. The storage unit 18 may be implemented as, for example, a drive device for a mobile recording medium, such as a magnetic tape or an optical disc, or may be implemented as a hard disk drive (HDD). Besides reading out a stored image data file to the image compression/decompression circuit 17, the storage unit 18 can supply information accompanying the data file to the CPU 21.

The image RAM 19 is connected via the image bus 20 to the camera-signal processing circuit 13, the face detection circuit 14, the programmable signal processing circuit 15, the display processing circuit 16, and the image compression/decompression circuit 17. The image RAM 19 is shared by these connected processing blocks, and image data is transferred between and among these blocks via the image RAM 19.

In the embodiment, these processing blocks have been described as transferring image data via the image RAM 19. However, for example, the face detection circuit 14 and the display processing circuit 16 may be configured to directly receive image data output from the camera-signal processing circuit 13 and the image compression/decompression circuit 17 without the image data passing through the image bus 20.

The CPU 21 is a block configured to control the overall imaging apparatus. The CPU 21 reads and executes programs stored in the EEPROM 22 to implement such control. Programs executed by the CPU 21 and the programmable signal processing circuit 15, and various data such as control data selected at the time the programs are executed are stored in advance in the EEPROM 22. Data is temporarily stored in the RAM 23 at the time the CPU 21 executes a program. For example, data including the face detection results obtained by the face detection circuit 14 and the programmable signal processing circuit 15 is stored in the RAM 23.

The gravity-direction sensor 24 detects the direction of gravitational force applied to the imaging apparatus and supplies the detection result to the CPU 21. On the basis of the detection result, the CPU 21 can determine the direction in which the imaging apparatus is tilted.

The basic operation of the imaging apparatus will now herein be described below. At the time of recording an image, signals generated by the image sensor 12 performing reception of light and photoelectric conversion are sequentially supplied to the camera-signal processing circuit 13, and the camera-signal processing circuit 13 applies digital conversion and image-quality correction to the signals. The processed image data passes through the image bus 20 and is temporality stored in the image RAM 19. The display processing circuit 16 receives the image data from the camera-signal processing circuit 13 via the image RAM 19, generates an image signal to be displayed, and supplies the image signal to the monitor (not shown). Accordingly, the image currently being captured (camera-through image) is displayed on the monitor, and a person who is capturing this image can view the image and check the angle of view.

The image compression/decompression circuit 17 sequentially receives pieces of output image data supplied from the camera-signal processing circuit 13 via the image RAM 19, compresses/encodes the image data to generate a moving image file, and records the moving image file in the storage unit 18. In response to pressing a shutter release button (not shown) or the like, one frame of image data from the camera-signal processing circuit 13 is compressed/encoded by the image compression/decompression circuit 17 to generate a still image file, and the still image file can be recorded in the storage unit 18.

The image file stored in the storage unit 18 is read to the image compression/decompression circuit 17, and the image compression/decompression circuit 17 decompresses/decodes the image file, and supplies the decompressed/decoded image data to the display processing circuit 16. The display processing circuit 16 converts the image data into a signal to be displayed. Accordingly, a moving image or a still image can be reproduced and displayed on the monitor.

At the time of recording an image, which has been described above, the face detection circuit 14 receives output image data from the camera-signal processing circuit 13 via the image RAM 19 and performs face detection. The output image data from the camera-signal processing circuit 13 is also supplied to the programmable signal processing circuit 15 via the image RAM 19, and the programmable signal processing circuit 15 can perform face detection on the basis of the image data. The face detection results obtained by the face detection circuit 14 and the programmable signal processing circuit 15 are supplied to the CPU 21. As discussed below, the face detection circuit 14 and the programmable signal processing circuit 15 can receive the detection result obtained by the other circuit via the CPU 21 and further perform face detection on the basis of the detection result received.

The CPU 21 obtains, for example, the final detection result on the basis of the detection results obtained by these processing blocks and uses the final detection result to calculate control values for AE, AF, white-balance adjustment, and the like. For example, the CPU 21 adjusts the aperture or the white balance gain so as to optimize the brightness or color of the detected face, or adjusts the focus on the detected face. Information of the face detection result (e.g., positional information regarding a face area) may be recorded as accompanying information of the image file in the storage unit 18.

At the time of reproducing an image file in the storage unit 18, each of the face detection circuit 14 and the programmable signal processing circuit 15 may receive image data that has been decompressed/decoded by the image compression/decompression circuit 17 via the image RAM 19 and perform face detection. In that case, face detection can be performed by the processing blocks at the same time as the recording of an image. The CPU 21 obtains the final detection result on the basis of the detection results obtained by the processing blocks and, for example, records the final detection result as accompanying information of the original image file. Alternatively, the CPU 21 updates the original accompanying information. The detection result may be displayed, together with the reproduced image, on the monitor, or the detection result may be recorded in the EEPROM 22 for later use in other processes.

Next, face detection using the face detection circuit 14 and the programmable signal processing circuit 15 will now herein be described in detail below.

Figure 2:
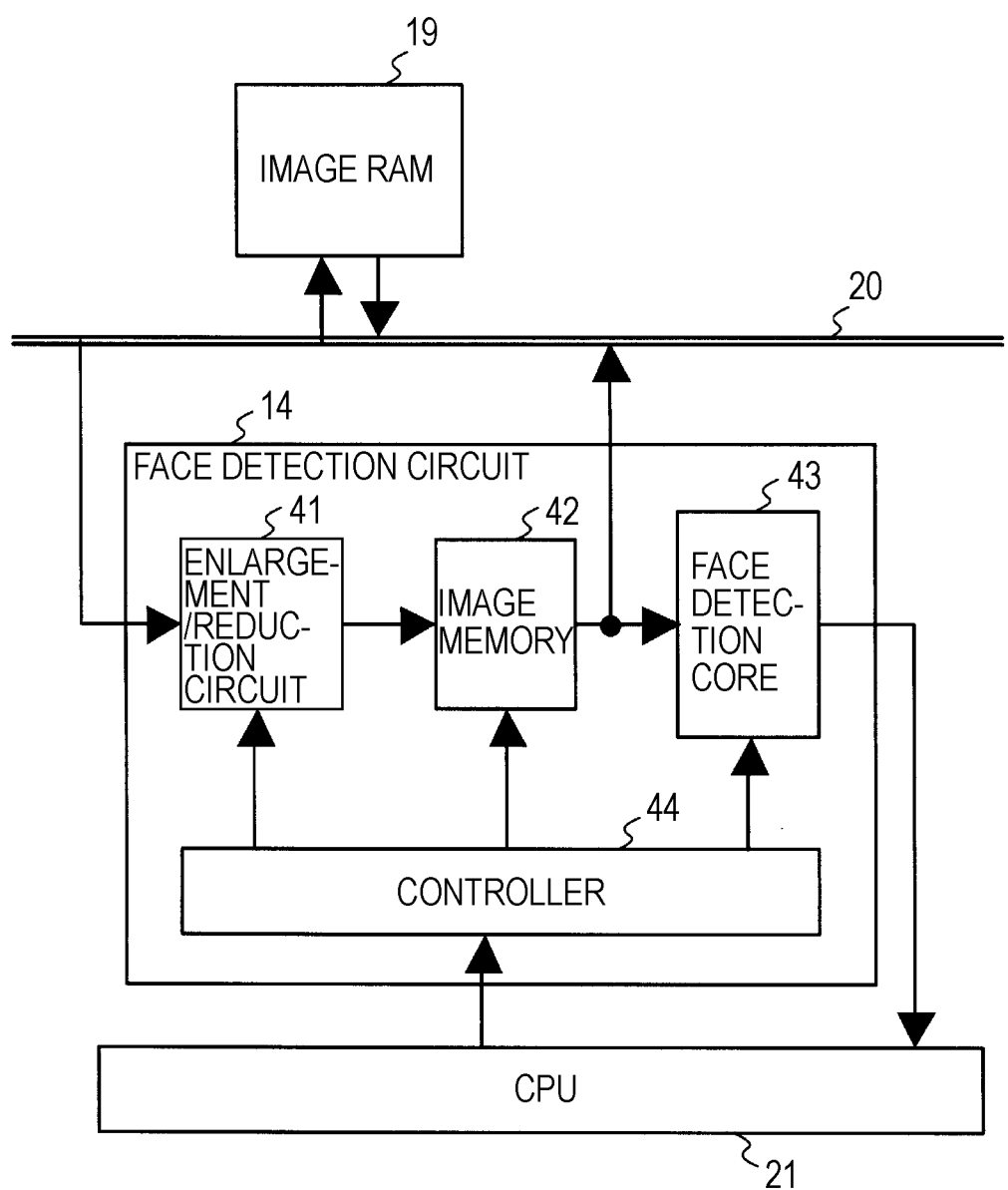
FIG. 2 is a block diagram of an exemplary internal configuration of a face detection circuit.

FIG. 2 is a block diagram of an exemplary internal configuration of the face detection circuit 14.

The face detection circuit 14 is dedicated hardware configured to perform face detection, as has been described above. Referring to FIG. 2, the face detection circuit 14 contains an enlargement/reduction circuit 41, an image memory 42, a face detection core 43, and a controller 44.

In the face detection circuit 14, the face detection core 43 is a circuit block configured to perform face detection. In the embodiment, the face detection core 43 performs matching between a face template image of a predetermined size and an input image and determines the presence of a face on the basis of a correlation value. The enlargement/reduction circuit 41 converts the size (the number of pixels in the horizontal and vertical directions) of image data read from the image RAM 19 via the image bus 20 so as to be compatible with face detection by the face detection core 43. The image memory 42 temporarily stores the image data converted by the enlargement/reduction circuit 41, clips out an image of a predetermined size on the basis of a read address specified by the controller 44, and outputs the clipped image to the face detection core 43. The clipped image data is written into the image RAM 19 for later use.

The controller 44 controls the operation of the enlargement/reduction circuit 41, the image memory 42, and the face detection core 43 on the basis of face detection parameters supplied from the CPU 21. For example, the controller 44 outputs an image-data enlargement/reduction rate to the enlargement/reduction circuit 41, a write/read memory address to the image memory 42, and a control value specifying the face search direction or the like to the face detection core 43.

FIG. 3 is a flowchart of a basic face detection process performed by the face detection circuit 14. In step S11, the CPU 21 sets face detection parameters for the controller 44 in the face detection circuit 14. In accordance with the setting of the face detection parameters, the controller 44 controls the operation from step S12 onward.

In step S12, the controller 44 sets an image enlargement/reduction rate for the enlargement/reduction circuit 41. The enlargement/reduction circuit 41 reads, from the image RAM 19, for example, only one frame of image data which has been output from the camera-signal processing circuit 13 and recorded in the image RAM 19, converts the image size in accordance with the setting entered from the controller 44, and temporarily records the size-converted image data in the image memory 42.

In order to reduce the space used in the image memory 42, only a predetermined area of the above-mentioned one-frame image in the image RAM 19 may be read. In that case, the image data is repeatedly read in units of predetermined areas until the entire image data is read. Every time data is read, the processing in steps S12 to S18 is repeated.

In step S13, the image memory 42 clips out an area of a predetermined size as a face window from the size-converted image recorded in step S12 in accordance with the read address specified from the controller 44 and outputs the face window to the face detection core 43.

The processing in steps S12 and S13 is intended to make a face area possibly existing in the image read from the image RAM 19 coincide the size of a face template used in face detection by the face detection core 43. That is, the face detection core 43 stores a face template of a predetermined size in an internal memory. The image memory 42 clips out an area of the same size as that of the face template from the recorded image.

In step S14, the face detection core 43 performs the matching between the face window supplied from the image memory 42 and many face templates stored in the face detection core 43 and calculates a correlation value therebetween.

In step S15, the face detection core 43 determines whether an image in the face window is a face by determining whether each of the correlation values calculated in step S14 is sufficiently high. For example, the face determination is made by determining whether the maximum value of the calculated correlation values exceeds a predetermined threshold.

In the case where the face detection core 43 determines in step S15 that the image in the face window is a face, the face detection core 43 performs the processing in step S17. Otherwise, the face detection core 43 performs the processing in step S18.

In step S17, the face detection core 43 temporarily stores the face detection result in the internal memory and temporarily holds the face detection result. An exemplary face detection result includes information regarding a face area (e.g., the coordinates of a reference position in the image and the size in the horizontal and vertical directions relative to the reference position), the direction in which the face is pointing, the tilt angle of the face, the angle of view at the time the image has been captured, an evaluation value indicating the "faceness" (e.g., an evaluation value based on the above-mentioned correlation value), and an enlargement/reduction rate employed in the enlargement/reduction circuit 41 at the time the face has been detected.

In step S18, the controller 44 determines whether the last face window has already been clipped out from the image stored in the image memory 42. In the case that the last face window has not been clipped out yet, the controller 44 changes the position to clip out a face window and performs the processing in step S13. In the case that the last face window has been clipped out, the controller 44 performs the processing in step S19.

In step S19, the controller 44 determines whether to perform the face detection again by changing the size of a face to be detected on the basis of the face detection parameters set by the CPU 21. In the case that the controller 44 does not perform the detection again, the controller 44 proceeds to step S20. In the case that the controller 44 determines to perform the detection again, the controller 44 returns to step S12 and implements control so as to re-read the same image from the image RAM 19. At this point, the enlargement/reduction rate set for the enlargement/reduction circuit 41 is changed, and hence a face of a different size in the input image can be detected.

In step S20, the face detection core 43 outputs the face detection result held in step S17 to the CPU 21.

An additional description concerning the setting of the face detection parameters in step S11 will now be given.

The detection accuracy and the detection speed of the face detection circuit 14 can be changed in accordance with the face detection parameters set for the face detection circuit 14 by the CPU 21. For example, faces of any size can be detected in the same input image by changing the enlargement/reduction rate to various rates in the enlargement/reduction circuit 41. As a result, the detection accuracy is improved. In contrast, the processing speed becomes slower. The detection accuracy and the processing speed change depending on the number of face templates used in the face detection core 43. For example, the detection accuracy can be improved by performing the matching using face templates having different face directions and tilt angles.

The controller 44 can specify the face search direction (search angle) in the face detection core 43 in accordance with the face detection parameters set by the CPU 21. Face detection in accordance with the face search direction will now be described using FIGS. 4A to 4C and FIG. 5.

FIGS. 4A to 4C illustrate the relationship between the angle of view at the time an image has been captured and a search angle. In FIGS. 4A to 4C, dotted windows represent face windows corresponding to detected faces.

At the time of capturing moving images, recorded moving images are displayed on a general television monitor. Thus, the imaging apparatus is used in a predetermined direction at all times. A captured image will be, as shown in FIG. 4A, an image with a horizontally long angle of view in which a scanning reference point Px0 resides in the upper left corner. In contrast, at the time of capturing still images, the imaging apparatus is used at various tilt angles. Besides the angle of view shown in FIG. 4A, other possible angles of view include, for example, as shown in FIG. 4B, a vertically long angle of view in which the imaging apparatus is tilted to the right so that the scanning reference point Px0 resides in the upper right corner, and, as shown in FIG. 4C, a vertically long angle of view in which the imaging apparatus is tilted to the left so that the scanning reference point Px0 resides in the lower left corner. If the image is tilted at a different angle, so is the direction of the face in the image. It is therefore necessary to control the face search direction in implementing the face detection. The controller 44 in the face detection circuit 14 can set the face search angle for the face detection core 43 in accordance with the face detection parameters set by the CPU 21.

Figure 5:
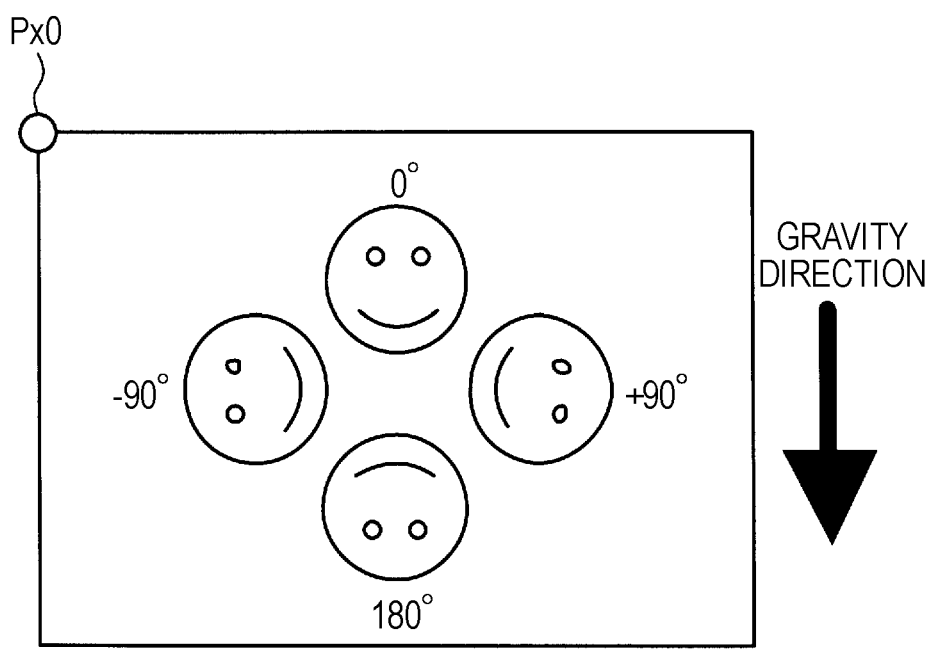
FIG. 5 illustrates an exemplary definition of a face search angle.

FIG. 5 shows an exemplary definition of the face search angle.

For example, four types of face search angles, namely, 0°, +90°, −90°, and 180°, can be set for the face detection core 43, as shown in FIG. 5. In this definition, the face search angle at the angle of view shown in FIG. 4A is 0° serving as the reference; and −90° corresponds to the face search angle at the angle of view shown in FIG. 4B, and +90° corresponds to the face search angle at the angle of view shown in FIG. 4C.

The imaging apparatus according to the embodiment has the gravity-direction sensor 24. In accordance with a detection signal from the gravity-direction sensor 24, the CPU can automatically determine the tilt of the imaging apparatus at the time an image has been captured and, on the basis of the tilt, set the above-mentioned face search angle as a face detection parameter for the face detection circuit 14.

Alternatively, a user may enter the tilt at the time an image has been captured using input keys or the like, and the CPU 21 may set the search angle on the basis of the information entered. Alternatively, the frequency of a search direction occurring based on search-angle setting history may be stored in the EEPROM 22, and the CPU 21 may read the above-mentioned search direction frequency next time the CPU 21 performs face detection, based on which the CPU 21 may predict and set the search angle. When detecting a face in an image reproduced from a still image file stored in the storage unit 18, in the case where tilt information at the time the image has been captured is stored as accompanying information of the still image file, the CPU 21 may set the search angle on the basis of the tilt information.

Further, one image may contain faces tilted at different angles. Therefore, when detecting a face(s) in one image, the CPU 21 may set a plurality of search angles in the face detection circuit 14, as shown in FIG. 5. This can reduce the number of omissions in face detection.

Figure 6:
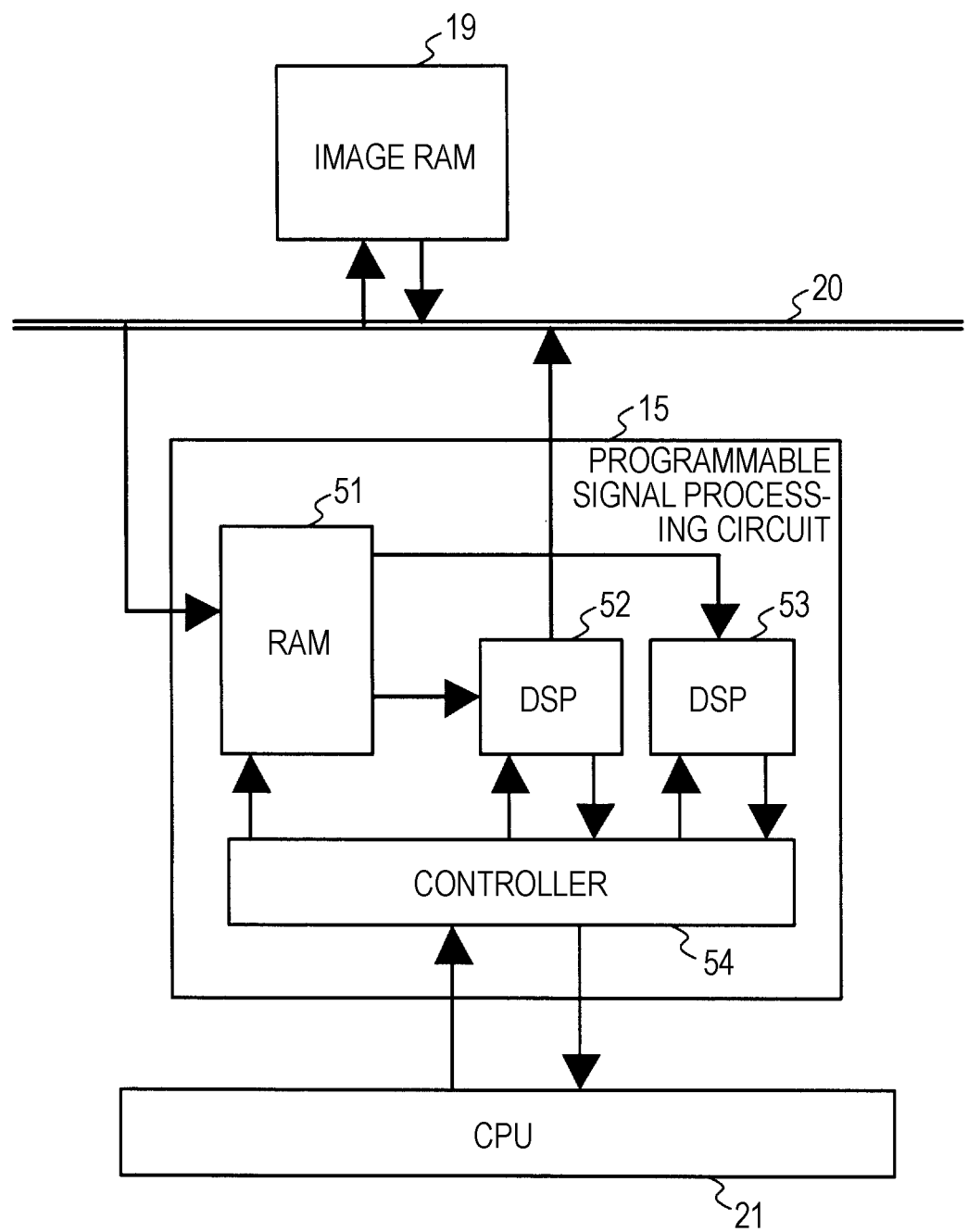
FIG. 6 is a block diagram of an exemplary internal configuration of a programmable signal processing circuit.

FIG. 6 is a block diagram of an exemplary internal configuration of the programmable signal processing circuit 15.

The programmable signal processing circuit 15 includes a RAM 51, digital signal processors (DSPs) 52 and 53, and a controller 54. The RAM 51 temporarily stores image data read from the image RAM 19 and programs supplied from the controller 54. The DSPs 52 and 53 are signal processing modules configured to perform, for example, face detection by executing a program stored in the RAM 51. In the embodiment, the two DSPs 52 and 53 are provided. The controller 54 controls the operation of the DSPs 52 and 53 in accordance with control information from the CPU 21 and specifies a write/read address in the RAM 51.

In the programmable signal processing circuit 15, a program stored in the EEPROM 22 is read by the CPU 21 and stored in the RAM 51 via the controller 54. At the same time, various control parameters are given from the CPU 21 to the controller 54, and the controller 54 in turn sets the parameters for the DSPs 52 and 53. In accordance with the details of the program and the control parameters, the programmable signal processing circuit 15 combines a plurality of arithmetic logic units (ALUs) to generate a command set for face detection and executes the command set. In other words, as the CPU 21 loads a new program, the processing content to be performed by the programmable signal processing circuit 15 can be updated as necessary.

In the case where face detection is performed, image data read from the image RAM 19 is temporarily stored in the RAM 51 and then loaded into the DSPs 52 and 52 performing the face detection. At this time, information based on the face detection result obtained by the face detection circuit 14 may be set by the CPU 21 as a control parameter for the DSPs 52 and 53. The face detection results obtained by the DSPs 52 and 53 are output to the CPU 21 via the controller 54.

The programmable signal processing circuit 15 may apply other signal processes, besides the face detection, to image data read from the image RAM 19 in accordance with a program loaded by the CPU 21 to the RAM 51 at the time of recording or reproducing an image. For example, the programmable signal processing circuit 15 may perform part of the detection function and the image-quality correction function of the camera-signal processing circuit 13. In this case, the detection result is supplied to the CPU 21, and the image-quality-corrected image data is temporarily stored in the image RAM 19 and loaded into, for example, the display processing circuit 16 or the image compression/decompression circuit 17. Alternatively, different processes may be performed in recording and reproducing an image. Alternatively, the DSPs 52 and 53 may perform different signal processes.

In the imaging apparatus with the above-described configuration, face detection can be performed by both the face detection circuit 14 and the programmable signal processing circuit 15. Since the face detection circuit 14 is a hardware circuit dedicated to face detection, as has been described above, it is difficult to greatly change the detection procedure, although the detection accuracy and the processing speed may be changed in accordance with the setting of the face detection parameters. In contrast, in the case of the programmable signal processing circuit 15, not only the detection setting, but also the detection algorithm, for example, can be greatly changed in accordance with a program loaded by the CPU 21. The programmable signal processing circuit 15 is highly flexible to the detection accuracy or the like. However, in the case where, for example, the same detection algorithm is used to detect a face in the same image area with the same detection accuracy, the face detection circuit 14 can perform the face detection more quickly than the programmable signal processing circuit 15 can.

In the imaging apparatus according to the embodiment, face detection through hardware using the face detection circuit 14 and face detection through software using the programmable signal processing circuit 15 are employed, and the face detection results obtained by these blocks are appropriately combined, thereby outputting the final detection result from the CPU 21. As discussed below, a detection algorithm and face detection parameters mainly focusing on the detection speed rather than the detection accuracy are employed in the face detection circuit 14. In contrast, a detection algorithm and face detection parameters mainly focusing on the detection accuracy rather than the detection speed are employed in the programmable signal processing circuit 15. For example, the parameter setting may be more detailed in the programmable signal processing circuit 15 than in the face detection circuit 14, or the programmable signal processing circuit 15 may be configured to detect a face with a specific feature, which is difficult to be detected by the face detection circuit 14. Face detection processes are appropriately performed by the face detection circuit 14 and the programmable signal processing circuit 15 in a serial or parallel manner. If necessary, face detection parameters of one circuit may be set on the basis of the detection result obtained by the other circuit.

With the operation described above, advantages of both hardware and software are merged to achieve both the processing speed and the face detection accuracy as best as possible. Using the same circuit configuration including the face detection circuit 14 and the programmable signal processing circuit 15, the flexibility to model changes and feature expansion of the imaging apparatus can be enhanced, thereby suppressing the development and production cost over a long period of time.

The following description concerns specific examples of face detection using both the face detection circuit 14 and the programmable signal processing circuit 15.

First Face Detection Process

Figure 7:
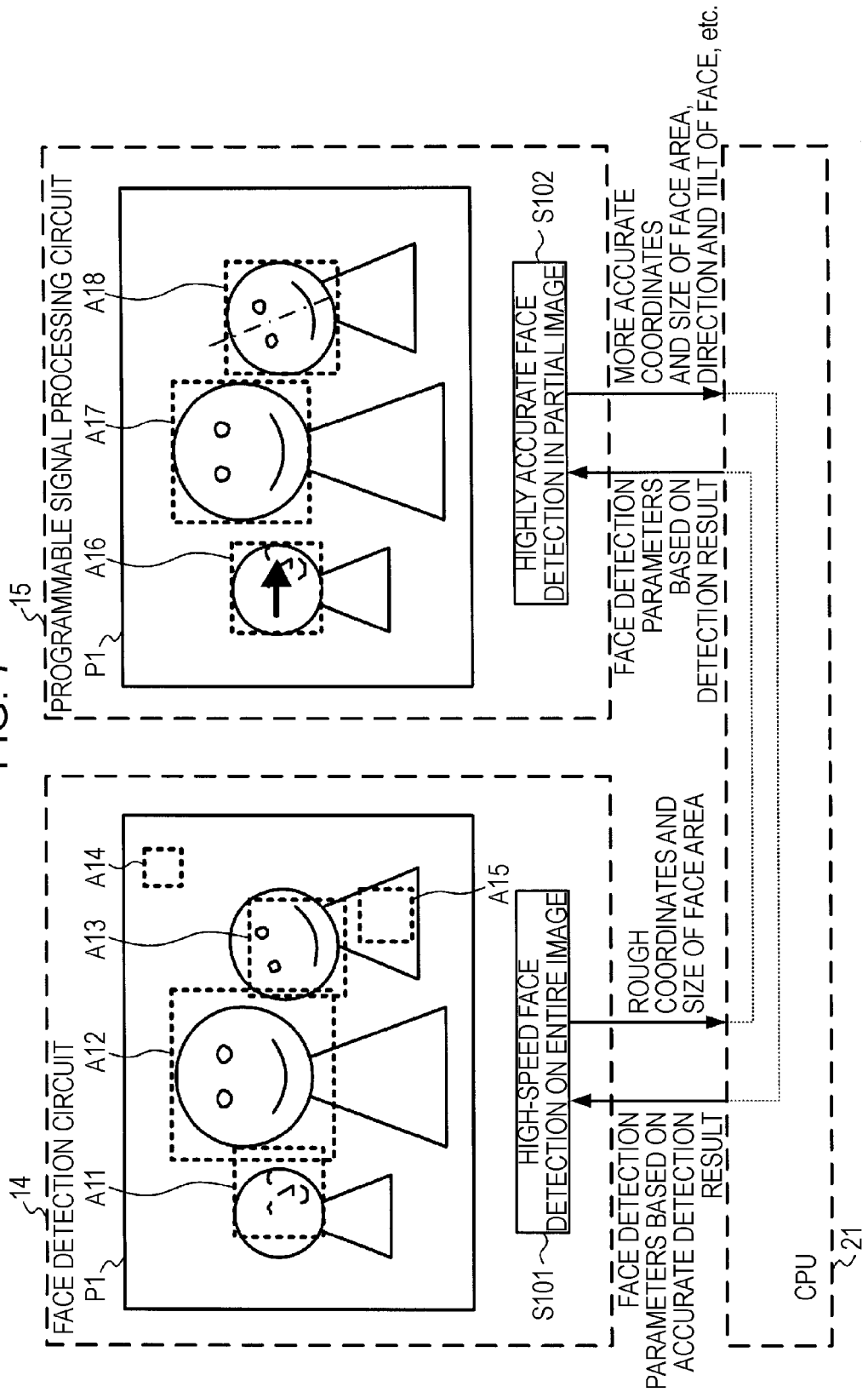
FIG. 7 is a diagram of the outline of a first face detection process.

FIG. 7 is a diagram of the outline of a first face detection process.

In the first face detection process shown in FIG. 7, the face detection circuit 14 performs high-speed face detection on the entirety of an input image P1 (step S101). The programmable signal processing circuit 15 performs face detection with higher accuracy on a partial area of the input image P1 on the basis of the detection result obtained by the face detection circuit 14 (step S102). The CPU 21 outputs the final detection result on the basis of the detection results obtained by these blocks.

More specifically, the face detection circuit 14 allows some detection errors and detects the rough position and size of a face area in the entire input image such that at least omissions in face detection can be avoided. That is, the face detection circuit 14 gives priority to the detection speed over the detection accuracy. FIG. 7 shows that, with the above-described detection process performed by the face detection circuit 14, face areas A11 to A15 are detected in the input image P1. A face is also detected even in areas where a face does not exist (the face areas A14 and A15).

In contrast, a processing program and face detection parameters are set for the programmable signal processing circuit 15 such that face areas can be detected more accurately than by the face detection circuit 14. The programmable signal processing circuit 15 can detect the accurate position and size of a face area. In addition, detection errors are more reliably avoided in the programmable signal processing circuit 15 than in the face detection circuit 14. In this case, the CPU 21 places a limit to face detection areas in the programmable signal processing circuit 15 on the basis of the result of detecting face areas by the rough detection processing by the face detection circuit 14 (e.g., the coordinates and size of face areas). Accordingly, the programmable signal processing circuit 15 can achieve both the high accuracy and the reduced processing time.

In the example shown in FIG. 7, on the basis of the face detection result obtained in the input image P1 by the programmable signal processing circuit 15, face areas A16 to A18 corresponding to the face areas A11 to A13, respectively, are detected as face areas. The face areas A14 and A15, which have been mistakenly detected as face areas, are deleted from the detection result. Thus, the presence of each face and its existing area are more accurately detected.

The programmable signal processing circuit 15 outputs the accurate coordinates and size of each face area as the face detection result obtained by such processing to the CPU 21. Besides the coordinates and size of each face area, more detailed parameters, such as the direction of a detected face, the tilt of the face, an evaluation value of the "faceness" (e.g., information regarding a correlation value obtained by template matching), and detection error information indicating, of the detection result obtained by the face detection circuit 14, an area where a face does not exist, may be detected and output to the CPU 21. In the example shown in FIG. 7, the direction of a face is indicated by an arrow in the face area A16, and the tilt of a face is indicated by a dotted-chain line in the face area A18.

The CPU 21 obtains the final detection result on the basis of the above-mentioned detection result obtained by the programmable signal processing circuit 15 and uses the final detection result for other control processing including AE and AF. That is, the programmable signal processing circuit 15 can output various highly accurate detection results within a minimum processing time in accordance with the specification of a program loaded and the parameters set by the CPU 21. Therefore, the detection results can be flexibly applied to a wider variety of applications.

The CPU 21 can also recalculate and set face detection parameters for the face detection circuit 14 on the basis of the accurate detection result obtained by the programmable signal processing circuit 15.

In the first face detection process, as shown in FIG. 7, it is preferable that the face detection circuit 14 and the programmable signal processing circuit 15 perform face detection on the basis of data of the same input image P1. In the actual processing, however, the programmable signal processing circuit 15 may perform face detection on an image delayed for one or a few frames with respect to an image detected by the face detection circuit 14.

Figure 8:
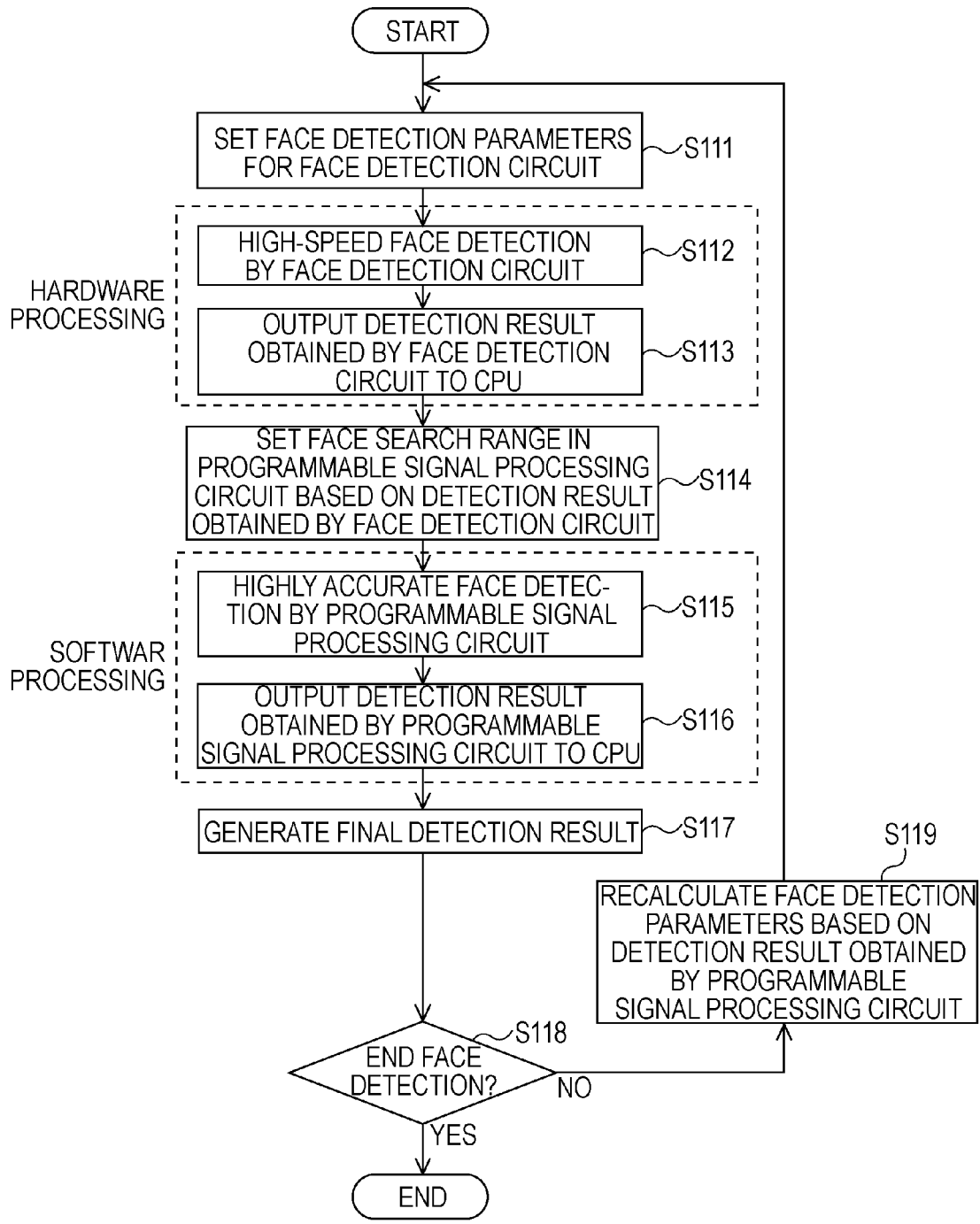
FIG. 8 is a flowchart of the first face detection process performed in the imaging apparatus.

FIG. 8 is a flowchart of the first face detection process performed in the imaging apparatus. In step S111, the CPU 21 sets face detection parameters for the face detection circuit 14.

In step S112, the controller 44 in the face detection circuit 14 controls the enlargement/reduction circuit 41, the image memory 42, and the face detection core 43 on the basis of the face detection parameters set by the CPU 21 to perform high-speed detection processing for detecting a rough face area on the basis of one frame of image data, which is sequentially read from the image RAM 19 on a frame-by-frame basis.

After the face detection is completed by the face detection circuit 14, the face detection core 43 outputs the face detection result (e.g., the coordinates and size of a face area) to the CPU 21 in step S113. In step S114, the CPU 21 sets face detection parameters for the programmable signal processing circuit 15 on the basis of the detection result supplied from the face detection circuit 14. For example, the CPU 21 sets such face detection parameters for the programmable signal processing circuit 15 that only the face area detected by the face detection circuit 14 and the surrounding area thereof can serve as a face search range. Before performing step S111, the CPU 21 loads in advance a necessary face detection program to the RAM 51 in the programmable signal processing circuit 15.

In step S115, the controller 54 in the programmable signal processing circuit 15 transfers, of image data read from the image RAM 19, data corresponding to the face area detected by the face detection circuit 14 and the surrounding area thereof to the DSPs 52 and 53 (or one of the DSPs 52 and 53) on the basis of the face detection parameters set by the CPU 21, and allows the DSPs 52 and 53 to perform face detection focusing on the detection accuracy.

In step S116, the controller 54 in the programmable signal processing circuit 15 receives the face detection results from the DSPs 52 and 53 and outputs the face detection results to the CPU 21. In step S117, the CPU 21 generates the final face detection result on the basis of the face detection result obtained by the programmable signal processing circuit 15.

The processing in steps S114 to S116 may be performed only in the case where a face has been detected by the face detection circuit 14. In step S118, the CPU 21 determines whether to end the face detection process. In the case where the CPU 21 determines not to end the face detection process, the CPU 21 performs the processing in step S119.

In step S119, the CPU 21 recalculates face detection parameters for the face detection circuit 14 on the basis of the face detection result obtained by the programmable signal processing circuit 15. Thereafter, the flow returns to step S111, and the CPU 21 sets the recalculated face detection parameters for the face detection circuit 14 and allows the face detection circuit 14 to start face detection on the next image.

The following procedure of recalculating face detection parameters may be possible. For example, the face search range in the face detection circuit 14 is limited on the basis of the position and size of a face area detected by the programmable signal processing circuit 15. In this case, the CPU 21 calculates a motion vector on the basis of information regarding the direction of a face detected by the programmable signal processing circuit 15, and the face search range in the face detection circuit 14 may be specified on the basis of the vector motion. Information regarding the calculated motion vector may be recorded in the storage unit 18 or output to an external device as accompanying data of the corresponding image file.

On the basis of detection error information from the programmable signal processing circuit 15, a face area that has been mistakenly detected by the face detection circuit 14 may be controlled not to be searched. On the basis of information regarding the direction and tilt of a face detected by the programmable signal processing circuit 15, face templates to be used for determining the matching in the face detection circuit 14 may be controlled to be limited to those of great necessity.

In the above-described first face detection process, the face detection circuit 14 detects a rough face area so as to avoid omissions in detecting a face in the entire input image, and hence the face detection circuit 14 can perform high-speed face detection. Highly accurate face detection is then performed by the programmable signal processing circuit 15 using the surrounding area of a face area obtained by the detection by the face detection circuit 14 as a face search range. Despite the fact that the programmable signal processing circuit 15 can accurately detect a face area and correct the detection result obtained by the face detection circuit 14, the face search range is limited, and hence the detection processing time is reduced. While maintaining the detection accuracy equivalent to that in the case where the single programmable signal processing circuit 15 alone performs face detection, the processing speed of the programmable signal processing circuit 15 can be greatly increased. For example, using such a face detection result, AF control and adjustment of the image quality such as the white balance can be easily implemented with relatively low processing load while tracking the detected face.

Since the face search range in the programmable signal processing circuit 15 can be limited on the basis of the detection result obtained by the face detection circuit 14, the programmable signal processing circuit 15 can output various detection results including the direction and tilt of a face without increasing the processing time. Therefore, the detection results can be flexibly applied to a wider variety of applications.

By recalculating the face detection parameters set for the face detection circuit 14 on the basis of the detection result obtained by the programmable signal processing circuit 15, the processing in the face detection circuit 14 becomes more efficient and can be completed more quickly. For example, within a predetermined time, only the surrounding area of a face area detected by the programmable signal processing circuit 15 serves as a face search area in the next input image in the face detection circuit 14, thereby reducing the processing time. In such a case, a certain degree of detection accuracy can be maintained since adjacent input images are highly correlated with each other.

Alternatively, the face detection performed by the face detection circuit 14 and the programmable signal processing circuit 15 in the above-described procedure and the recalculation of face detection parameters for the face detection circuit 14 may be selectively performed in accordance with an operation mode set in the imaging apparatus.

For example, in the case of a still-image recording mode, the CPU 21 displays an image that has been captured prior to a recording operation on a monitor. When a user is adjusting the angle of view, only the face detection processing by the face detection circuit 14 in steps S112 and S113 is performed, and AE and AF control is implemented on the basis of the detection result. Accordingly, an image can be quickly displayed, though with less detection accuracy, and the power consumption during the detection can be suppressed. For example, when a shutter release button is pressed halfway, the face detection processing by the programmable signal processing circuit 15 in steps S115 and S116 is also performed, thereby performing accurate face detection. In the case of a moving-image recording mode, the recalculation of face detection parameters for the face detection circuit 14 in step S119 is performed, for example, at predetermined time intervals, whereby the face detection accuracy can be maintained, while reducing the overall processing load. Accordingly, the image recording can be reliably performed at a predetermined frame rate.

Although the face detection by the face detection circuit 14 and the face detection by the programmable signal processing circuit 15 are performed in a serial manner in the above-described flowchart, they can be done in a parallel manner. For example, the face detection circuit 14 can perform face detection on a frame-by-frame basis. In contrast, the programmable signal processing circuit 15 may not be able to complete face detection in a period of one frame. In such a case, information regarding a rough face area detected by the face detection circuit 14 is output by the CPU 21 as a detection result every frame, and, using the accurate face-area information output every few frames from the programmable signal processing circuit 15, the CPU 21 corrects the detection result obtained by the face detection circuit 14. In the programmable signal processing circuit 15, only the face search range may be necessary to be specified on the basis of the most recent detection result obtained by the face detection circuit 14. As in the processing in step S119 described above, the face detection parameters for the face detection circuit 14 may be reset on the basis of the detection result obtained by the programmable signal processing circuit 15. With such processing, the result of detecting a face area can be reliably output on a frame-by-frame basis in the case of, for example, recording a moving image, and the accuracy of the detection result can thus be improved.

As another example of the case of parallel processing, the face detection circuit 14 performs face detection, and the programmable signal processing circuit 15 in turn performs face detection on an image of the next frame on the basis of the detection result obtained by the face detection circuit 14. In this case, at the same time as the programmable signal processing circuit 15 performs face detection, the face detection circuit 14 starts performing face detection on the image of the same frame. Alternatively, if the face detection circuit 14 can complete face detection more quickly than the programmable signal processing circuit 15 can, the face detection circuit 14 starts face detection from the next frame onward so that the face detection will be completed by the face detection circuit 14 at the same time as the face detection performed by the programmable signal processing circuit 15 ends. With such processing, the result of detecting a face area can be reliably output on a frame-by-frame basis, and the accuracy of the detection result can thus be improved.

Second Face Detection Process

Figure 9:
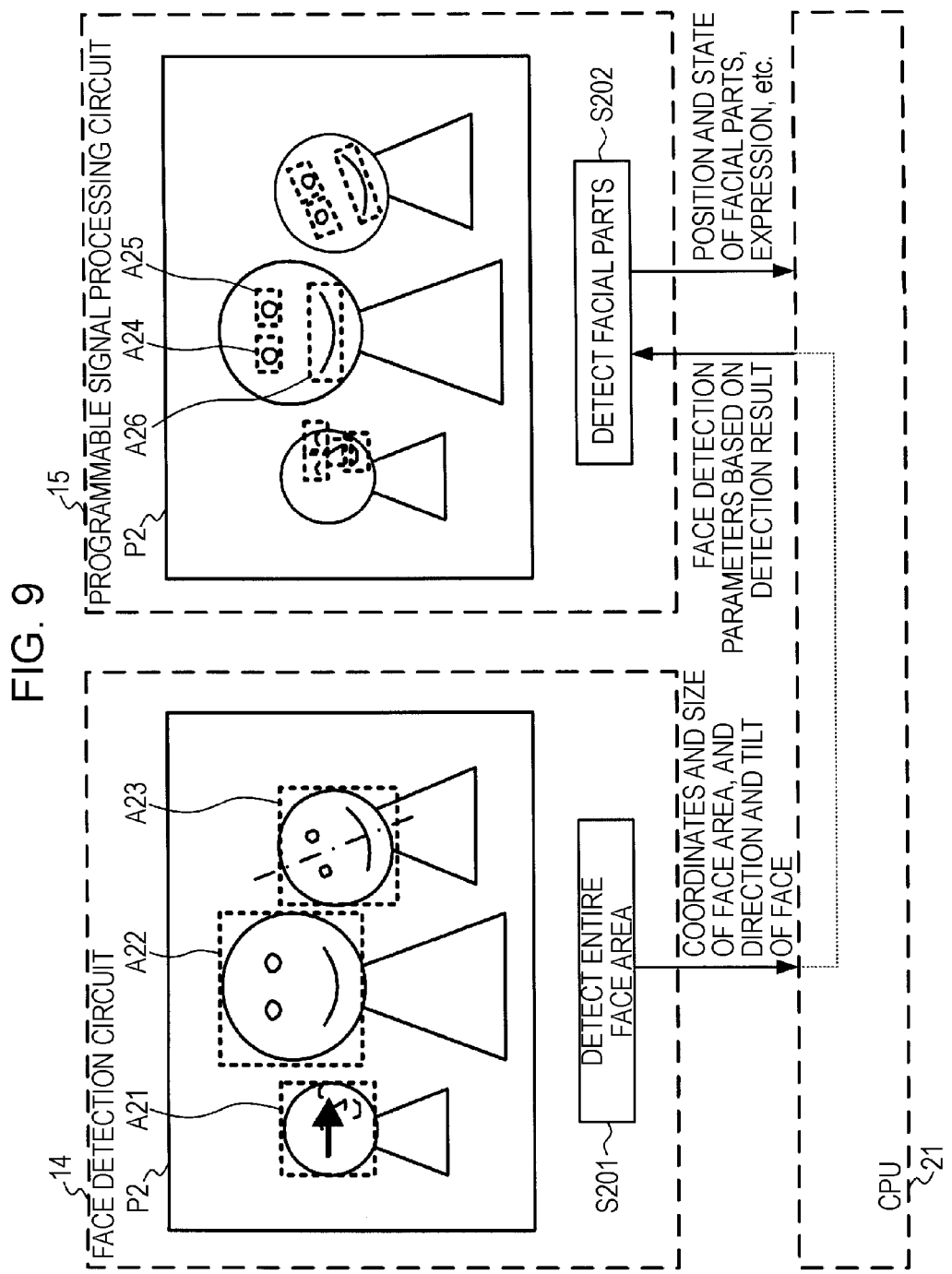
FIG. 9 is a diagram of the outline of a second face detection process.

FIG. 9 is a diagram of the outline of a second face detection process.

In the second face detection process shown in FIG. 9, the face detection circuit 14 detects a face in the entirety of an input image P2 and outputs information regarding an area including the entire face (step S201). The programmable signal processing circuit 15 detects the position and state (direction, tilt, shape, and the like) of parts in and around the face, such as the eyes, mouth, lip, nose, eyebrows, eye glasses, mask, and the like (hereinafter simply referred to as "facial parts") in the input image P2 (step S202). In this case, the programmable signal processing circuit 15 may employ, in the input image, only the face area detected by the face detection circuit 14 or an area including the surrounding area of the detected face area as a search area for searching for facial parts, thereby reducing the time necessary for detecting the parts.

The face detection circuit 14 may not only detect the coordinates and size of a face, but also the direction and tilt of the face. By setting these pieces of information as face detection parameters for the programmable signal processing circuit 15, the programmable signal processing circuit 15 is informed in advance of deviations in direction, tilt, and position of the facial parts, whereby the programmable signal processing circuit 15 can detect the parts more quickly and accurately. The programmable signal processing circuit 15 may output an evaluation value generated by evaluating the facial expression on the basis of the result of detecting the position and state of the facial parts.

In the example shown in FIG. 9, with the detection process performed by the face detection circuit 14, face areas A21 to A23 are detected in the input image P2. The direction of a face is indicated by an arrow in the face area A21, and the tilt of a face is indicated by a dotted-chain line in the face area A23. Among these areas, in the face area A22, eye areas A24 and A25 and a mouth area A26 are detected as facial parts by the processing performed by the programmable signal processing circuit 15.

As in the first face detection process, it is also preferable in the second face detection process that the face detection circuit 14 and the programmable signal processing circuit 15 perform detection of a face and facial parts on the basis of data of the same input image P2. In the actual processing, however, the programmable signal processing circuit 15 may perform detection on an image delayed for one or a few frames with respect to an image detected by the face detection circuit 14.

Figure 10:
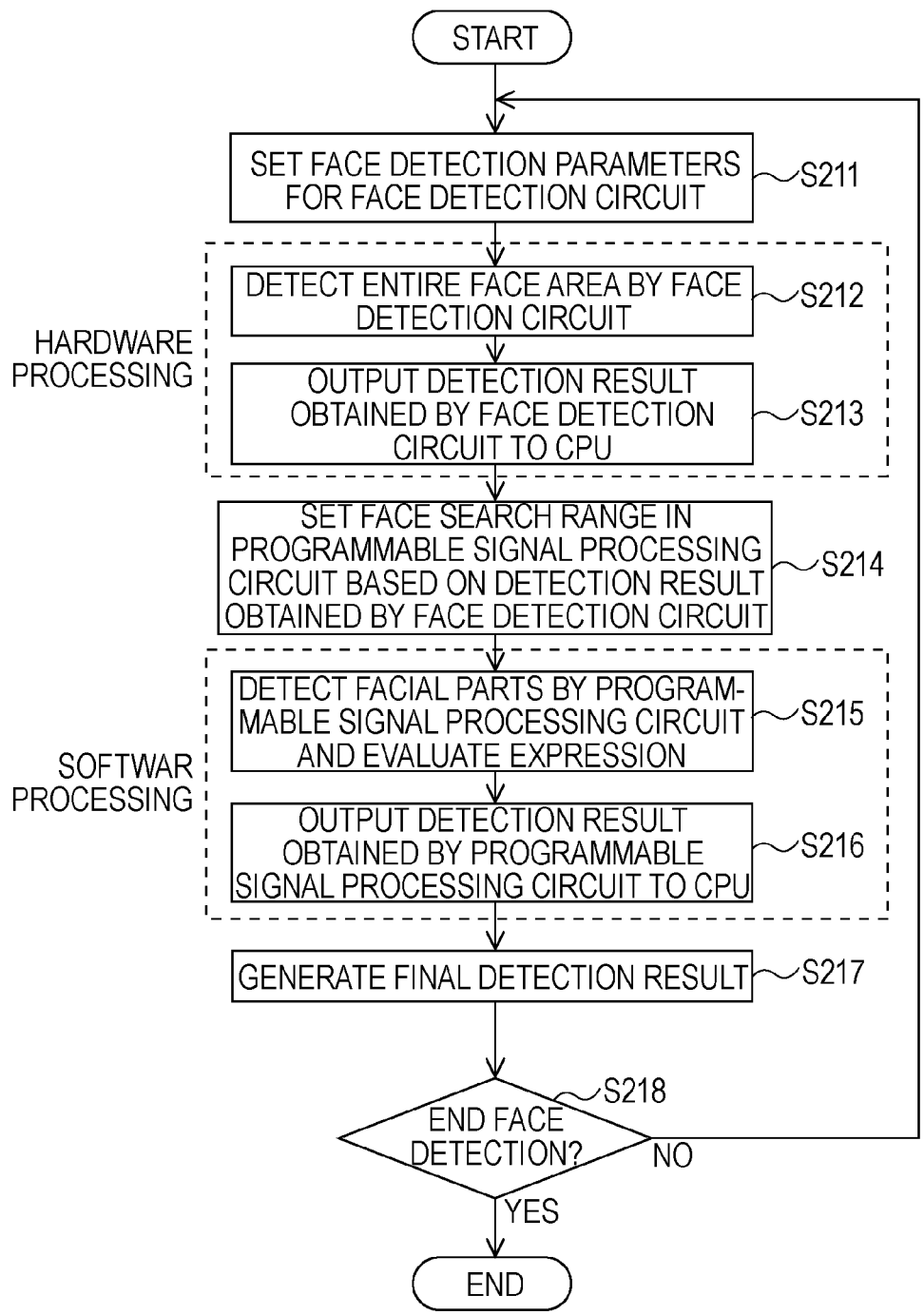
FIG. 10 is a flowchart of the second face detection process performed in the imaging apparatus.

FIG. 10 is a flowchart of the second face detection process performed in the imaging apparatus. In step S211, the CPU 21 sets face detection parameters for the face detection circuit 14.

In step S212, the controller 44 in the face detection circuit 14 controls the enlargement/reduction circuit 41, the image memory 42, and the face detection core 43 on the basis of the face detection parameters set by the CPU 21 to detect the entire face area on the basis of one frame of image data, which is sequentially read from the image RAM 19 on a frame-by-frame basis.

After the face detection is completed by the face detection circuit 14, the face detection core 43 outputs the face detection result (e.g., the coordinates, size, direction, and tilt of a face area) to the CPU 21 in step S213.

In step S214, the CPU 21 sets face detection parameters for the programmable signal processing circuit 15 on the basis of the detection result supplied from the face detection circuit 14. For example, the CPU 21 sets such face detection parameters for the programmable signal processing circuit 15 that only the face area detected by the face detection circuit 14 and the surrounding area thereof can serve as a face search range. In addition, the CPU 21 informs the programmable signal processing circuit 15 of information regarding the direction and tilt of the face.

In step S215, the controller 54 in the programmable signal processing circuit 15 transfers, of image data read from the image RAM 19, data corresponding to the face area detected by the face detection circuit 14 and the surrounding area thereof to the DSPs 52 and 53 (or one of the DSPs 52 and 53) on the basis of the face detection parameters set by the CPU 21, and allows the DSPs 52 and 53 to perform the processing to detect facial parts and generate an evaluation value of the facial expression.

In step S216, the controller 54 in the programmable signal processing circuit 15 receives the result of detecting the facial parts and the evaluation value of the facial expression from the DSPs 52 and 53 and outputs these results to the CPU 21.

In step S217, the CPU 21 generates the final face detection result on the basis of the face-part detection results and the expression evaluation value obtained by the programmable signal processing circuit 15. The processing in steps S214 to S216 may be performed only in the case where a face has been detected by the face detection circuit 14.

In step S218, the CPU 21 determines whether to end the face detection process. In the case where the CPU 21 determines not to end the face detection process, the flow returns to step S211, and the CPU 21 allows the face detection circuit 14 to perform the face detection again.

In the above-described second face detection process, the programmable signal processing circuit 15 detects facial parts in a limited search area on the basis of the face-area detection result obtained by the face detection circuit 14, thereby reducing the processing time of the programmable signal processing circuit 15. While maintaining the accuracy of detecting facial parts, the detection processing becomes faster. By using information regarding the direction and tilt of a face detected by the face detection circuit 14 as control parameters for the programmable signal processing circuit 15, the detection processing in the programmable signal processing circuit 15 becomes more efficient and can be completed more quickly.

In the programmable signal processing circuit 15, which parts to detect, which type of information to use as detection results among, for example, the position, size, state of the parts, and which expressions to evaluate on the basis of the detection results can be changed as necessary by changing control parameters set by the CPU 21 or a program executed by the CPU 21. These changes can be made, for example, in accordance with an imaging mode selected by user operation or can be automatically made in accordance with an imaging situation.

The programmable signal processing circuit 15 can determine, on the basis of the state of facial parts, the facial expression such as a smile or a serious face and evaluate the degree of the facial expression. Such determination and detection results are used to control, under control of the CPU 21, for example, when capturing a portrait photograph of a person, the automatic shutter-release at the time the facial expression changes to a smile or, when capturing an identification (ID) photograph, the automatic image capturing at the time the face is not smiling.

Under control of the CPU 21, whether each person being photographed is blinking or not is determined on the basis of the result of detecting the state of the eyes, and the shutter can be released automatically at the time all the persons being photographed are not blinking. On the basis of the result of detecting the state of the eyes of a person being photographed, the direction in which the person is gazing can be estimated, and the shutter can be released at the time the person is gazing at the imaging lens. On the basis of the result of detecting the state of the eyes, an undesired case where the color of the eyes is not favorable, such as when the eyes are "red" or light is being reflected from the eyeball, is detected, and the shutter operation can be controlled, or the color of a captured image can be corrected.

Whether a person being photographed is speaking or not is determined on the basis of the result of detecting the state of the mouse or lip, and, in the case where the person is speaking, a microphone can be automatically turned on, or the determination result can be employed to control the shutter operation timing.

Accordingly, various functions of high added values can be included in the imaging apparatus without changing the internal configuration, thereby implementing a sophisticated product at low cost. A new product can be placed on a market by flexibly changing the specification of the product without changing the basic configuration.

In the second face detection process, as in the above-mentioned flowchart, the face detection by the face detection circuit 14 and the face detection by the programmable signal processing circuit 15 can be performed in a parallel manner, instead of a serial manner. For example, the face detection circuit 14 performs face detection, and the programmable signal processing circuit 15 in turn performs face detection on an image of the next frame on the basis of the detection result obtained by the face detection circuit 14. In this case, at the same time as the programmable signal processing circuit 15 performs face detection, the face detection circuit 14 starts performing face detection on the image of the same frame. Alternatively, if the face detection circuit 14 can complete face detection more quickly than the programmable signal processing circuit 15 can, the face detection circuit 14 starts face detection from the next frame onward so that the face detection will be completed by the face detection circuit 14 at the same time as the face detection performed by the programmable signal processing circuit 15 ends. With such processing, the result of detecting facial parts can be reliably output on a frame-by-frame basis, and the accuracy of the detection result can thus be improved.

Third Face Detection Process

Figure 11:
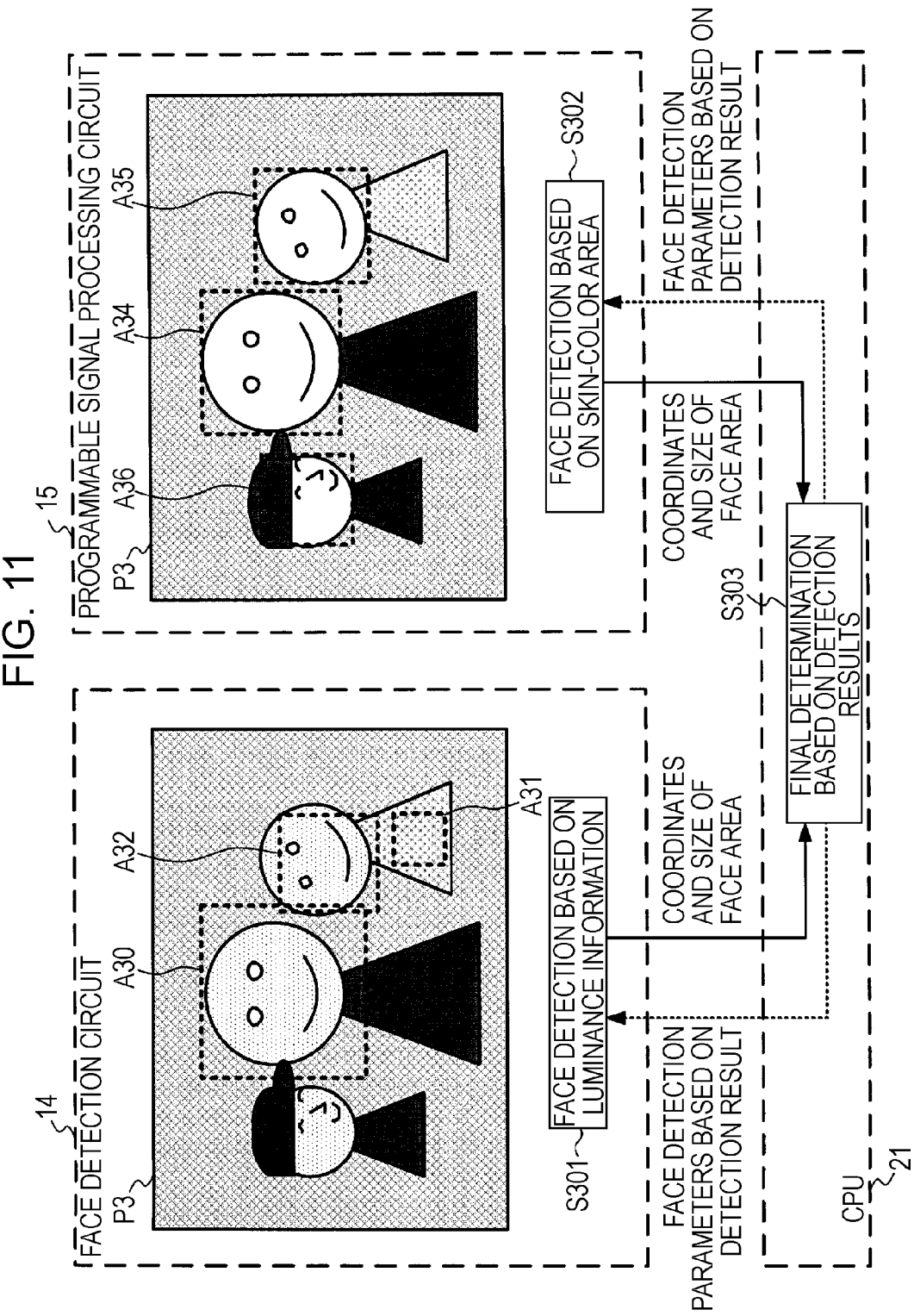
FIG. 11 is a diagram of the outline of a third face detection process.

FIG. 11 is a diagram of the outline of a third face detection process.

In the third face detection process shown in FIG. 11, the face detection circuit 14 detects a face on the basis of luminance information of data of an input image P3 (step S301). In contrast, the programmable signal processing circuit 15 detects a face on the basis of information indicating a skin-color area of the input image P3 (step S302). For example, the programmable signal processing circuit 15 detects an area with the hue of the skin color and detects a face in the detected skin-color area or an area including the surrounding of the skin-color area using a detection algorithm differing from that employed by the face detection circuit 14. Alternatively, the programmable signal processing circuit 15 may detect the detected skin-color area as a face area.

The CPU 21 determines the final face area by additionally taking into consideration the detection results obtained by the blocks (step S303), thereby implementing highly accurate face detection. For example, the processing speed of the face detection circuit 14 can be improved by detecting a face using only luminance information. In contrast, errors or omissions in face detection may occur. In such a case, a face is more accurately detected on the basis of detection of a skin-color area, thereby completing the detection result obtained by the face detection circuit 14.

In the example shown in FIG. 11, the face detection circuit 14 detects a face area A31, which is mistakenly detected as an area having the same brightness as the skin color and the same pattern as the skin. However, face detection performed by the programmable signal processing circuit 15 proves that the face area A31 has been mistakenly detected, and hence the face area A31 is finally deleted from the detection result. The programmable signal processing circuit 15 detects a face area A36, but the face detection circuit 14 has detected no face in an area corresponding to the face area A36. Because a face in the face area A36 is partially hidden by a cap, the face detection circuit 14 has probably omitted this area in detection. With face detection performed by the programmable signal processing circuit 15, such omissions in detection can be avoided.

In the above-described example, the weakness of one detection algorithm is compensated for by the detection result obtained by the other detection algorithm. Alternatively, the CPU 21 may control the blocks to compensate for the weakness of the detection algorithms with each other. Further, the CPU 21 may reset face detection parameters for the blocks on the basis of the detection results obtained by the blocks so that the face detection can be more efficiently performed.

Figure 12:
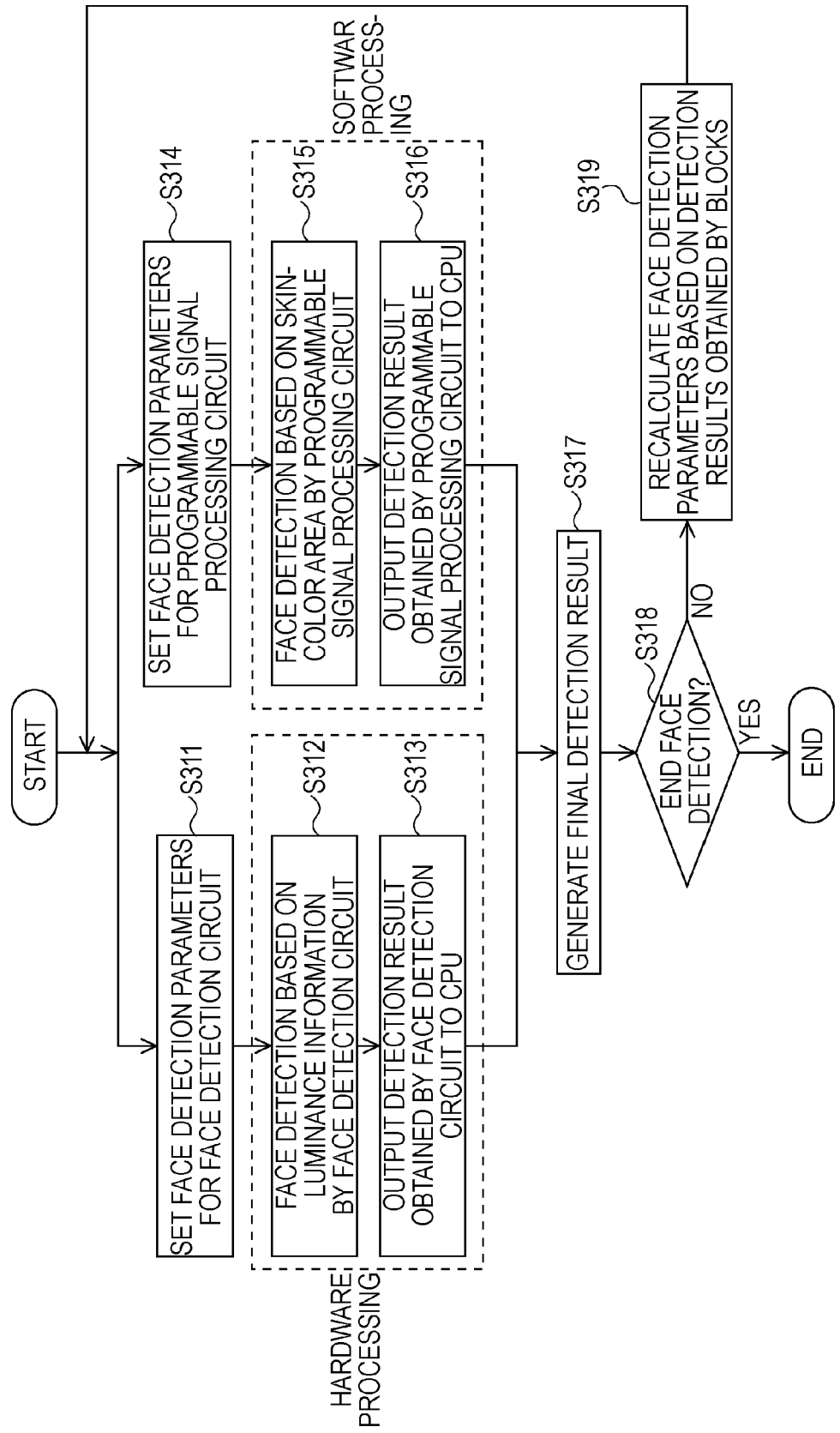
FIG. 12 is a flowchart of the third face detection process performed in the imaging apparatus.

FIG. 12 is a flowchart of the third face detection process performed in the imaging apparatus. In step S311, the CPU 21 sets face detection parameters for the face detection circuit 14.

In step S312, the controller 44 in the face detection circuit 14 controls the enlargement/reduction circuit 41, the image memory 42, and the face detection core 43 on the basis of the face detection parameters set by the CPU 21 to detect a face area on the basis of luminance information in one frame, which is read from the image RAM 19 on a frame-by-frame basis.

After the face detection is completed by the face detection circuit 14, the face detection core 43 outputs the face detection result (e.g., the coordinates and size of a face area) to the CPU 21 in step S313. In step S314, the CPU 21 sets face detection parameters for the programmable signal processing circuit 15 in parallel to the processing in step S311.

In step S315, the controller 54 in the programmable signal processing circuit 15 transfers image data read from the image RAM 19 to the DSPs 52 and 53 (or one of the DSPs 52 and 53) on the basis of the face detection parameters set by the CPU 21, and allows the DSPs 52 and 53 to perform face detection on the basis of a skin-color area.

As has been described above, the programmable signal processing circuit 15 detects, for example, an area with the hue as that of the skin color on the basis of color components of an input image, and detects a face in the detected skin-color area or an area including the surrounding of the skin-color area using a detection algorithm differing from that employed by the face detection circuit 14. Alternatively, the programmable signal processing circuit 15 may detect a face in the area on the basis of signal components (e.g., chrominance components) differing from those employed by the face detection circuit 14.

Alternatively, a skin-color area may be detected not by the programmable signal processing circuit 15, but by a known detection function of the camera-signal processing circuit 13, for example, to implement the white balance adjustment or the like. In this case, the CPU 21 instructs the programmable signal processing circuit 15 to regard a skin-color area detected by this detection function or an area including the surrounding thereof as a face search area.

In step S316, the controller 54 in the programmable signal processing circuit 15 receives the results of detecting the face area from the DSPs 52 and 53 and outputs the results to the CPU 21. In step S317, the CPU 21 generates the final face detection result on the basis of the detection results obtained by the face detection circuit 14 and the programmable signal processing circuit 15.

In step S318, the CPU 21 determines whether to end the face detection process. In the case where the CPU 21 determines not to end the face detection process, the CPU 21 performs the processing in step S319. In step S319, the CPU recalculates face detection parameters for the face detection circuit 14 and the programmable signal processing circuit 15 on the basis of the face detection results obtained by these blocks. Thereafter, the flow returns to steps S311 and S314, and the CPU 21 sets the recalculated face detection parameters for the face detection circuit 14 and the programmable signal processing circuit 15 and allows these blocks to start face detection on the next image.

As has been described above, the face detection by the face detection circuit 14 and the face detection by the programmable signal processing circuit 15 are performed in a parallel manner, and the final detection result is obtained by the CPU 21 on the basis of the detection results obtained by the face detection circuit 14 and the programmable signal processing circuit 15. Accordingly, the weakness of a detection algorithm employed in one block or of detection algorithms employed in both blocks can be compensated for by the processing by the CPU 21, thereby accurately detecting a face area.

In the above-described flowchart, the face detection by the face detection circuit 14 and the face detection by the programmable signal processing circuit 15 are performed once in a parallel manner. In the case where the face detection by the face detection circuit 14 can be completed more quickly than by the programmable signal processing circuit 15, the face detection circuit 14 may perform the face detection on a plurality of frames while the programmable signal processing circuit 15 is performing the face detection on one frame. In this case, every time the detection result is output from the face detection circuit 14, for example, the CPU 21 generates the final detection result on the basis of the output detection result and the most-recent detection result obtained by the programmable signal processing circuit 15. With such processing, the result of detecting a face area can be reliably output on a frame-by-frame basis in the case of, for example, recording a moving image, and the accuracy of the detection result can thus be improved.

By recalculating the face detection parameters in step S319, the face detection performed by the face detection circuit 14 and the programmable signal processing circuit 15 becomes more efficient. For example, the programmable signal processing circuit 15 outputs, besides face-area information obtained by the detection, skin-color-area information to the CPU 21. For the next predetermined couple of times, for example, the CPU 21 recalculates the face detection parameters for the programmable signal processing circuit 15 such that only a partial area of an input image including a skin-color area should serve as a face search range, thereby reducing the processing time of the programmable signal processing circuit 15. Such a function may be implemented not under control of the CPU 21, but by a detection program executed by the programmable signal processing circuit 15.

Further, for example, only a partial area including a skin-color area may be set as a face search range in the face detection circuit 14, and the face detection parameters may be recalculated such that the detection accuracy can be improved. In this case, the face detection circuit 14 performs face detection on the entirety of an input image every certain number of times, and, in the meantime, the face detection circuit 14 detects a face only in the search range based on the skin-color area. In the case where, as has been described above, a face is detected by two processing blocks using different algorithms or a face is detected on the basis of different image components, the overall detection speed can be increased while improving the detection accuracy by reflecting the detection result obtained by one block in the face detection performed by the other block.

Alternatively, the face detection performed by the face detection circuit 14 and the programmable signal processing circuit 15 in the above-described procedure and the recalculation of face detection parameters for the face detection circuit 14 and the programmable signal processing circuit 15 may be selectively performed in accordance with the operation mode set in the imaging apparatus.

For example, in the case of a still-image recording mode, the CPU 21 displays an image that has been captured prior to a recording operation on a monitor. When a user is adjusting the angle of view, only the face detection processing by the face detection circuit 14 in steps S312 and S313 is performed, and AE and AF control is implemented on the basis of the detection result. Accordingly, an image can be quickly displayed, though with less detection accuracy, and the power consumption during the detection can be suppressed. For example, when a shutter release button is pressed halfway, the face detection processing by the programmable signal processing circuit 15 in steps S315 and S316 is performed in a parallel manner, thereby performing accurate face detection on the basis of the detection results obtained by the blocks. In the case of a moving-image recording mode, the recalculation of face detection parameters for the face detection circuit 14 and the programmable signal processing circuit 15 in step S319 is performed, for example, at predetermined time intervals, whereby the face detection accuracy can be maintained, while reducing the overall processing load. Accordingly, the image recording can be reliably performed at a predetermined frame rate.

Fourth Face Detection Process

Figure 13:
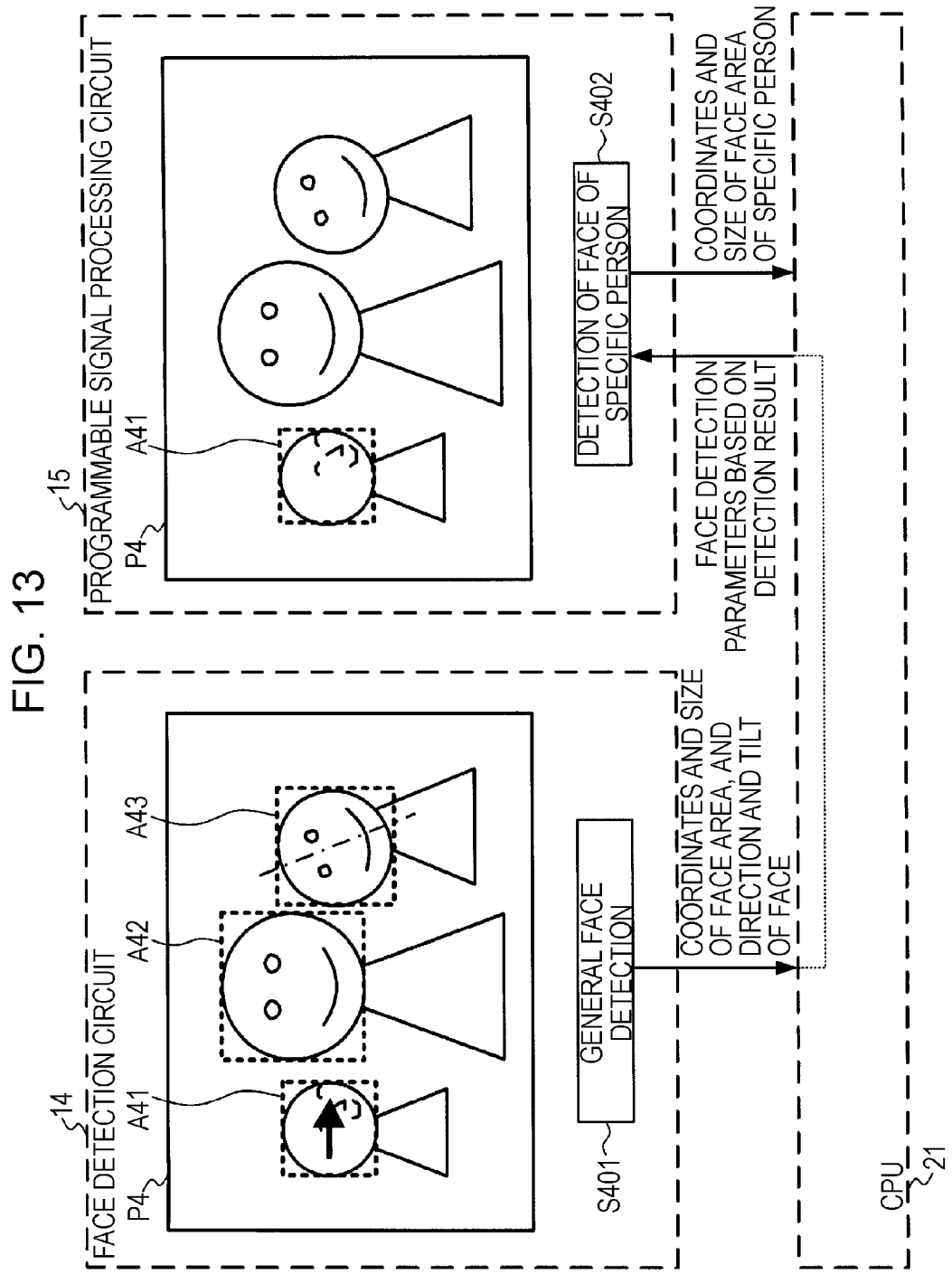
FIG. 13 is a diagram of the outline of a fourth face detection process.

FIG. 13 is a diagram of the outline of a fourth face detection process.

The fourth face detection process is to detect the face of a specific person or the face of a person with a specific feature in an input image. As shown in FIG. 13, the face detection circuit 14 performs general face detection on the entirety of an input image P4 without specifying a person or feature, and outputs the coordinates and size of a face area and the direction and tilt of a face (step S401). The programmable signal processing circuit 15 detects the face of a specific person or the face of a person with a specific feature in the input image P4 (step S402). In this case, the processing time spent by the programmable signal processing circuit 15 to detect a face is reduced by searching only a face area detected by the face detection circuit 14 or an area including the surrounding of the detected face area.

In the example shown in FIG. 13, the face detection circuit 14 performs the general face detection to detect face areas A41 to A43 in the input image P4. Among the face areas A41 to A43, a face included in the face area A41 is determined by the programmable signal processing circuit 15 as the face of a specific person.

The face detection circuit 14 may detect not only the coordinates and size of a face, but also the direction and tilt of a face. By setting these pieces of information as face detection parameters for the programmable signal processing circuit 15, the programmable signal processing circuit 15 is informed in advance of deviations in direction, tilt, and position of the facial parts, whereby the programmable signal processing circuit 15 can detect a face more quickly and accurately.

A specific person or a specific feature of the specific person may be selected by user operation or the like. In this case, as will be described with reference to FIG. 14 below, the programmable signal processing circuit 15 selects a face detection database (for example, including a face template or the like) to use in accordance with the specific person or feature selected. In contrast, the face detection circuit 14 only uses a database for general face detection irrespective of a specific person or feature thereof.

In the fourth face detection process, as in the first and second face detection processes, it is preferable that the face detection circuit 14 and the programmable signal processing circuit 15 perform face detection on the basis of data of the same input image P4. In the actual processing, however, the programmable signal processing circuit 15 may perform face detection on an image delayed for one or a few frames with respect to an image detected by the face detection circuit 14.

Figure 14:
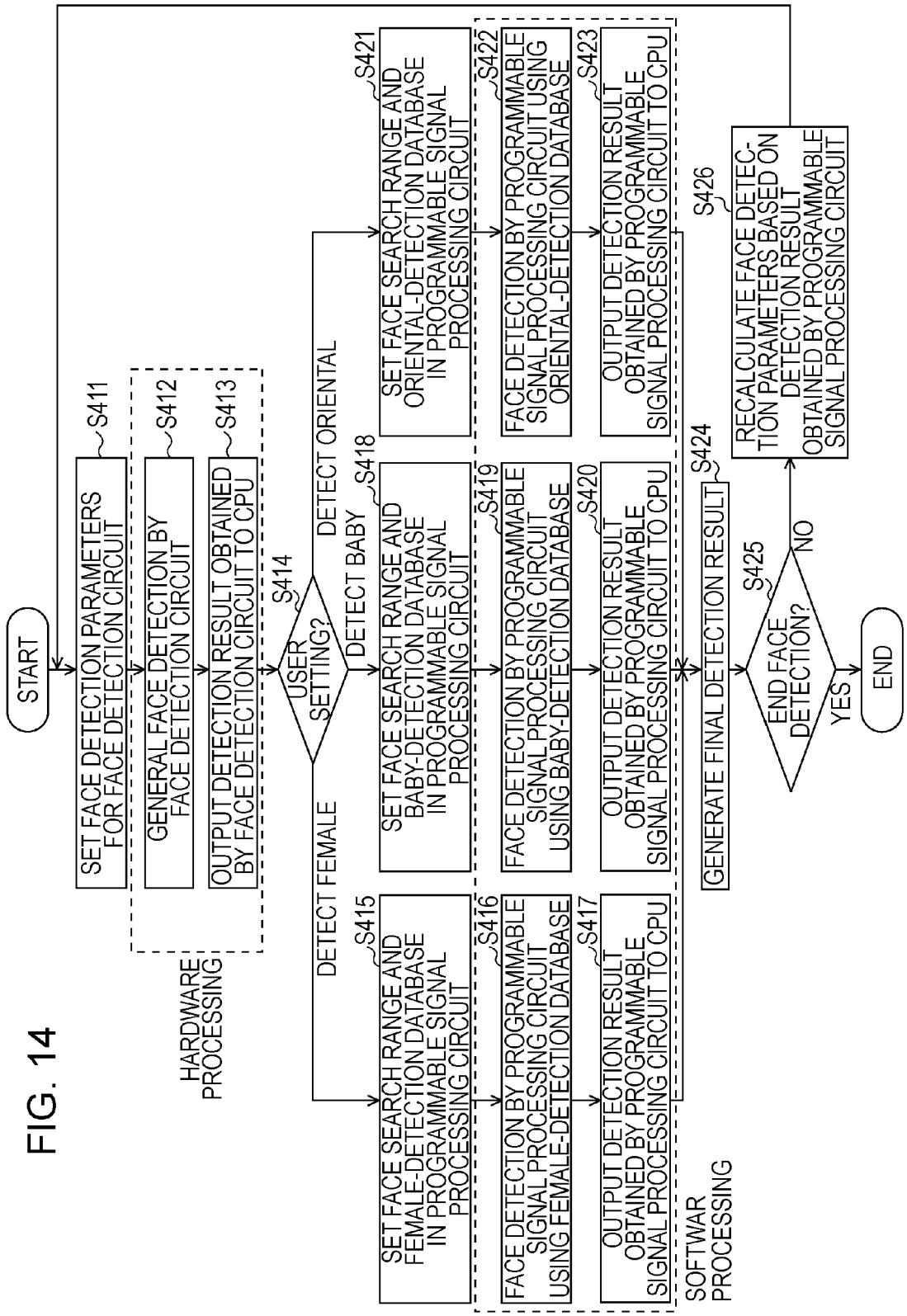
FIG. 14 is a flowchart of the fourth face detection process performed in the imaging apparatus.

FIG. 14 is a flowchart of the fourth face detection process performed in the imaging apparatus.

In the process shown in FIG. 14, as an exemplary case in which a face with a specific feature is detected, one of a female face, a baby face, or an Oriental face can be detected in accordance with selection by user operation.

In step S411, the CPU 21 sets face detection parameters for the face detection circuit 14. In step S412, the controller 44 in the face detection circuit 14 controls the enlargement/reduction circuit 41, the image memory 42, and the face detection core 43 on the basis of the face detection parameters set by the CPU 21 to perform general face detection on the basis of one frame of image data, which is sequentially read from the image RAM 19 on a frame-by-frame basis.

After the face detection is completed by the face detection circuit 14, the face detection core 43 outputs the face detection result (e.g., the coordinates and size of a face area, and the direction and tilt of a face) to the CPU 21 in step S413.

In step S414, the CPU 21 determines the type of specific feature that has been specified by a user to detect a face. In the case where a female face has been set to be detected, the CPU 21 performs the processing in step S415. In the case where a baby face has been set to be detected, the CPU 21 performs the processing in step S418. In the case where an Oriental face has been set to be detected, the CPU 21 performs the processing in step S421.

In step S415, the CPU 21 sets face detection parameters for detecting a female face in the programmable signal processing circuit 15. In this case, for example, the face detection parameters instruct the programmable signal processing circuit 15 to regard only a face area detected by the face detection circuit 14 and an area including the surrounding thereof as a face search range. At the same time, the programmable signal processing circuit 15 is informed of information regarding the direction and tilt of a face. Further, a database for female-face detection is set. In this database, for example, information regarding a feature point of a female face or the like is recorded.

In step S416, the controller 54 in the programmable signal processing circuit 15 controls the DSPs 52 and 53 to perform face detection using the database for female-face detection on the basis of the face detection parameters set by the CPU 21.

In step S417, the controller 54 in the programmable signal processing circuit 15 receives the face detection results from the DSPs 52 and 53 and outputs the results to the CPU 21. The processing in steps S418 to S420 is substantially the same as the processing in steps S415 to S417, respectively. The difference is that, in step S418, the CPU 21 sets a database for baby-face detection in the programmable signal processing circuit 15 on the basis of the face detection parameters, and, in step S419, the programmable signal processing circuit 15 performs face detection using this database.

The processing in steps S421 to S423 is substantially the same as the processing in steps S415 to S417, respectively. The difference is that, in step S421, the CPU 21 sets a database for Oriental-face detection in the programmable signal processing circuit 15 on the basis of the face detection parameters, and, in step S422, the programmable signal processing circuit 15 performs face detection using this database.

In steps S415 to S423 described above, for example, databases focused on detecting the face of, for example, females, babies, and Orientals are loaded in advance in the RAM 51 of the programmable signal processing circuit 15, and, on the basis of the face detection parameters, the CPU 21 instructs the programmable signal processing circuit 15 as to which database to use. Alternatively, a face detection database in accordance with user selection may be read from the EEPROM 22 by the processing by the CPU 21 and loaded into the programmable signal processing circuit 15. Alternatively, not only a face detection database in accordance with user selection may be simply selected, but also a different face detection program for each facial feature to be detected may be executed by the programmable signal processing circuit 15.

In step S424, the CPU 21 generates the final detection result (e.g., the coordinates and size of a face) on the basis of the face detection result obtained by the programmable signal processing circuit 15. The processing in steps S414 to S424 may be implemented only in the case where a face has been detected by the face detection circuit 14.

In step S425, the CPU 21 determines whether to end the face detection process. In the case where the CPU 21 determines not to end the face detection process, the CPU 21 performs the processing in step S426. In step S426, the CPU 21 recalculates face detection parameters for the face detection circuit 14 on the basis of the face detection result obtained by the programmable signal processing circuit 15. Thereafter, the flow returns to step S411, and the CPU 21 sets the recalculated face detection parameters for the face detection circuit 14 and allows the face detection circuit 14 to start face detection on the next image. In one of steps S415, 418, and S421 thereafter, the CPU 21 sets the face detection parameters recalculated in step S416 in the programmable signal processing circuit 15.

Since the search range is limited in the programmable signal processing circuit 15 to detect a face on the basis of the face-area detection result obtained by the face detection circuit 14 in the fourth face detection process, the processing time of the programmable signal processing circuit 15 is reduced, thereby completing the detection process more quickly while maintaining the face detection accuracy. In particular, since more detailed detection is performed by the programmable signal processing circuit 15 in an area in which a face has already been determined by the face detection circuit 14 to exit, more accurate face detection can be implemented without increasing the processing load.

In the programmable signal processing circuit 15, a person or a facial feature to be detected can be changed in accordance with user setting. The functionality of the imaging apparatus can be enhanced without changing the internal configuration. The same basic circuit configuration can be applied to various products with different specifications. Accordingly, the developing and production cost of many products can be reduced.

Although the face detection by the face detection circuit 14 and the face detection by the programmable signal processing circuit 15 are performed in a serial manner in the fourth detection process as in the above-described flowchart, they can be done in a parallel manner. For example, the face detection circuit 14 starts performing face detection, and the programmable signal processing circuit 15 performs face detection on an image of the next frame on the basis of the detection result obtained by the face detection circuit 14. In this case, at the same time as the programmable signal processing circuit 15 performs face detection, the face detection circuit 14 starts face detection on the image of the same frame. Alternatively, if the face detection circuit 14 can complete face detection more quickly than the programmable signal processing circuit 15 can, the face detection circuit 14 starts face detection on the next frame onward so that the face detection will be completed by the face detection circuit 14 at the same time as the face detection performed by the programmable signal processing circuit 15 ends. With such processing, the result of detecting the face of a specific person or the face of a person with a specific feature can be reliably output on a frame-by-frame basis, and the accuracy of the detection result can thus be improved.

OTHER EMBODIMENTS

FIG. 15 is a block diagram of the configuration of an image recording/reproducing apparatus according to another embodiment of the present invention. In FIG. 15, the same reference numerals are used to denote the same blocks as those shown in FIG. 1.

The present invention is applicable not only to the above-described imaging apparatus, but also to an image recording/reproducing apparatus having no imaging function, as shown in FIG. 15. The image recording/reproducing apparatus is implemented as, for example, a video recorder. In this case, moving image data obtained from a reception signal of a television broadcast or the like is input via the image bus 20 to the image compression/decompression circuit 17 to be compressed/encoded and stored as a moving image file in the storage unit 18. Such a moving image file is read from the storage unit 18 and decompressed/decoded by the image compression/decompression circuit 17. Thereafter, an image processing circuit 25 applies, for example, various image-quality correction processes to the decompressed/decoded data and outputs the result to the display processing circuit 16, thereby displaying an image-quality-corrected reproduced image on a monitor (not shown).

At the time of reproducing a moving image, decompressed/decoded image data is supplied via the image RAM to the face detection circuit 14 and the programmable signal processing circuit 15, and a face can be detected in a reproduced image with the above-described face detection procedures. The face detection result can be used, for example, by the image processing circuit 25 to correct the color of the entire image such that the color of a detected face portion can become more appropriate.

As in the face detection procedures described above, the face detection can be performed quickly and accurately even in the image recording/reproducing apparatus. The detection procedure and setting can be flexibly changed in the programmable signal processing circuit 15 in accordance with the intended use of the face detection result, the necessary detection accuracy, detection information, and the like.

Although the apparatus in which, for example, an image can be recorded on a storage medium has been described above, the present invention is also applicable to a video player configured to reproduce image data stored in, for example, a portable storage medium. The present invention is also applicable to a reproducing apparatus configured to reproduce an image file which has been captured by another imaging device or received via a network and temporarily accumulated in the storage unit 18. Further, the present invention is applicable to a printer configured to print an image reproduced from an image file supplied from another device.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus, comprising:
a controller configured to set a detection parameter;
a face detection circuit including a dedicated hardware configured to detect first face information in an input image based on the detection parameter, wherein the first face information indicates a face detection range; and
a programmable signal processing circuit configured to detect second face information based on the first face information, wherein the controller is configured to update the detection parameter based on the second face information in accordance with a rewritable program including a face detection program for detecting the second face information in the input image.

2. The image processing apparatus according to claim 1, wherein the input image is captured by an imaging unit of the image processing apparatus.

3. The image processing apparatus according to claim 1, wherein the first face information is a detection result of the face detection circuit and the second face information is a detection result of the programmable signal processing circuit.

4. The image processing apparatus according to claim 1, wherein the first face information includes at least one of: coordinates of a face area of a face detected in the input image by the face detection circuit, size of the face area and a face search angle indicative of a tilt of the image processing apparatus.

5. The image processing apparatus according to claim 1, wherein the second face information includes at least one of: a direction of a detected face in the input image, a tilt of the detected face, an evaluation value of the detected face and detection error information.

6. The image processing apparatus according to claim 5, wherein the evaluation value of the detected face is a correlation value obtained by face template matching.

7. The image processing apparatus according to claim 5, wherein the detection error information indicates that a face does not exist in the face area detected by the face detection circuit.

8. The image processing apparatus according to claim 4, wherein the tilt of the imaging apparatus is detected by a sensor.

9. The image processing apparatus according to claim 4, wherein the face search angle is set according to at least one of:
a user input, and
frequency information of the face search angle set previously.

10. An image processing method, comprising:
in an image processing apparatus:
setting a detection parameter;
detecting, by a face detection circuit including a dedicated hardware, first face information in an input image based on the detection parameter, wherein the first face information indicates a face detection range; and
detecting, by a programmable signal processing circuit, second face information based on the detected first face information, wherein the detection parameter is updated based on the second face information in accordance with a rewritable program including a face detection program for detecting the second face information in the input image.

11. The image processing method according to claim 10, wherein the input image is captured by an imaging unit of the image processing apparatus.

12. The image processing method according to claim 10, wherein the first face information is a detection result of the face detection circuit of the image processing apparatus and the second face information is a detection result of the programmable signal processing circuit of the image processing apparatus.

13. The image processing method according to claim 10, wherein the first face information includes at least one of: coordinates of a face area of a face detected in the input image, size of the face area and a face search angle indicative of a tilt of the image processing apparatus.

14. The image processing method according to claim 10, wherein the second face information includes at least one of: a direction of a detected face in the input image, a tilt of the detected face, an evaluation value of the detected face and detection error information.

15. The image processing method according to claim 14, wherein the evaluation value of the detected face is a correlation value obtained by face template matching.

16. The image processing method according to claim 14, wherein the detection error information indicates that a face does not exist in the face area detected by the face detection circuit.

17. The image processing method according to claim 13, wherein the tilt of the imaging apparatus is detected by a sensor.

18. The image processing method according to claim 13, wherein the face search angle is set according to at least one of:
a user input, and
frequency information of the face search angle set previously.

19. A non-transitory computer readable medium having stored thereon, a set of computer-executable instructions for causing a computer to perform steps comprising:
setting a detection parameter;
detecting, by a face detection circuit including a dedicated hardware, first face information in an input image based on the detection parameter, wherein the first face information indicates a face detection range; and
detecting, by a programmable signal processing circuit, second face information based on the detected first face information, wherein the detection parameter is updated based on the second face information in accordance with a rewritable program including a face detection program for detecting the second face information in the input image.

20. An image processing apparatus, comprising:
a face detection circuit including a dedicated hardware circuit configured to detect a face in an input image based on a detection parameter;
a programmable signal processing circuit configured to perform signal processing based on an input image signal in accordance with a program including a face detection program; and
a controller configured to control face detection by the programmable signal processing circuit based on a face detection result obtained by the face detection circuit,
wherein the controller is configured to update the detection parameter based on the input image signal in accordance with a rewritable program including the face detection program for detecting the second face information in the input image, wherein a face detection speed of the face detection circuit is greater than a face detection speed of the signal processing circuit, wherein the controller sets a face detection area including a face area detected by the face detection circuit, and wherein the signal processing circuit performs face detection only in the face detection area of the input image set by the controller.

21. An image processing apparatus, comprising:

a controller configured to set a detection parameter;

a face detection circuit including a dedicated hardware configured to detect first face information in an input image based on the detection parameter, wherein the first face information indicates a face detection range; and a programmable signal processing circuit configured to detect second face information based on the detected first face information, wherein the controller is configured to update the detection parameter based on the second face information in accordance with a rewritable program including a face detection program for detecting the second face information in the input image, and wherein a face detection speed of the face detection circuit is greater than a face detection speed of the signal processing circuit.

* * * * *